(12) United States Patent
Aher et al.

(10) Patent No.: US 11,805,083 B2
(45) Date of Patent: Oct. 31, 2023

(54) SYSTEM AND METHODS TO GENERATE MESSAGES FOR USER SHARED MEDIA

(71) Applicant: Rovi Guides, Inc., San Jose, CA (US)

(72) Inventors: Ankur Anil Aher, Maharashtra (IN); Charishma Chundi, Andhra Pradesh (IN); Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/332,422

(22) Filed: May 27, 2021

(65) Prior Publication Data
US 2022/0385603 A1    Dec. 1, 2022

(51) Int. Cl.
| | |
|---|---|
| *H04L 51/046* | (2022.01) |
| *H04L 51/10* | (2022.01) |
| *G06F 16/435* | (2019.01) |
| *H04L 65/403* | (2022.01) |
| *H04L 51/52* | (2022.01) |

(52) U.S. Cl.
CPC .......... *H04L 51/046* (2013.01); *G06F 16/435* (2019.01); *H04L 51/10* (2013.01); *H04L 51/52* (2022.05); *H04L 65/403* (2013.01)

(58) Field of Classification Search
CPC ....... H04L 51/046; H04L 51/10; H04L 51/52; H04L 65/403; G06F 16/435
See application file for complete search history.

(56) References Cited

U.S. PATENT DOCUMENTS

| | | | |
|---|---|---|---|
| 10,791,433 B1 | 9/2020 | Harijan et al. | |
| 2010/0223341 A1* | 9/2010 | Manolescu | H04L 51/02 709/224 |
| 2014/0245335 A1* | 8/2014 | Holden | H04N 21/44218 725/12 |
| 2015/0293928 A1* | 10/2015 | Chen | H04N 21/25891 707/738 |
| 2015/0379722 A1* | 12/2015 | Goldberg | G06T 3/4092 382/298 |
| 2016/0191448 A1* | 6/2016 | Eck | H04L 51/52 709/206 |
| 2016/0352895 A1* | 12/2016 | Son | G10L 21/007 |
| 2020/0120049 A1* | 4/2020 | Galloway | H04L 51/02 |
| 2022/0100534 A1* | 3/2022 | Golobokov | G06F 9/4451 |

* cited by examiner

*Primary Examiner* — Nicholas R Taylor
*Assistant Examiner* — Tania M Pena-Santana
(74) *Attorney, Agent, or Firm* — HALEY GUILIANO LLP

(57) ABSTRACT

Systems and methods are provided for generating personalized messages. One example method includes identifying a media item at a first computing device and identifying a group of one or more recipients to send the media item and a personalized message to. An association between a user of the computing device and a recipient from the group is identified. A personalized message is generated based at least in part on the association between the user and the recipient. The media item and personalized message are sent to the recipient from the first computing device.

16 Claims, 24 Drawing Sheets

SYSTEM AND METHODS TO GENERATE MESSAGES FOR USER SHARED MEDIA

BACKGROUND

The present disclosure is directed towards systems and methods for generating personalized messages. In particular, systems and methods are provided herein that enable a message to be personalized based on an identified association between a user, typically the person sending a message, and a recipient of the message.

SUMMARY

With the proliferation of mobile computing devices comprising a camera, along with cheap storage for digital media items, the taking of photos and videos of everything from an eye-catching meal to a scenic view from a vacation has become ubiquitous. In addition, many people share these photos and videos with different contacts. For example, a user may have just returned from a vacation and may wish to share a media item, such as a photo, of the vacation with several contacts. In order to share the photo, the user may select the photo on a computing device, such as a smartphone, and the user may choose several contacts to send the media item to. As part of the sending, the user may select a messaging application and/or platform, such as WhatsApp or Instagram, to send the photo with. Once the user has chosen the contacts to send the photo to, the user may be presented with an option to add a message to send to the contacts at the same time as the photo. For example, the user may select a picture of La Concha Bay and choose to send it to Alice, Bob and Charlie via WhatsApp. The user may choose to send the message "I've just returned home from Spain" at the same time as the photo. However, although the user may wish to share the same media item with several contacts, the message that the user wishes to convey may be different for each contact, due to the different nature of the relationships between the user and each contact. For example, the relationship between the user and Alice may be son and mother, Bob may be a boyfriend of the user and Charlie may be a work colleague.

In view of the foregoing, it would be beneficial to have a system that is capable of generating personalized messages to be sent with a media item.

Systems and methods are described herein for generating personalized messages. In accordance with an aspect of the disclosure, a method is provided for generating personalized messages. The method includes identifying, at a first computing device, a media item and identifying a group of one or more recipients to send the media item and a personalized message to. An association between a user of the computing device and a recipient from the group is identified. A personalized message is generated based at least in part on the association between the user and the recipient. The media item and the personalized message are sent from the first computing device to the recipient. Personalizing a message comprises any action related to personalizing a message such as generating the words of a message, formatting the message (e.g., short sentences/paragraphs), display of the message (e.g., overlaid on the media item, below the media item) and/or the format of the message itself (e.g., text, audio, emoji, video). A typical example may include displaying a personalized text message beneath a media item; other examples include overlaying segments of a message over the media item and generating a personalized video of the user speaking a message that is displayed beneath a media item. In an example implementation, a user may wish to share a photo of a vacation location that is stored on their smartphone. The user may identify the photo that they wish to share by selecting the photo via an interface of the smartphone. On selecting the photo, the user may subsequently select an icon, via the interface, that enables the user to share the photo to one or more contacts. The contacts may, for example, be contacts stored in an address book on the smartphone. The user may manually select the contacts via an address book, and/or the smartphone may display a list of recently used contacts and the user may select the contacts from the list of recently used contacts. Once the desired contacts have been identified, an association or relationship between the user and one of the contacts is identified. For example, one of the contacts is the mother of the user. The relationship may be identified, for example, based on natural language processing of a historic message exchange between the user and the contact. Once the association between the contact and the user is identified, a personalized message is generated. For example, machine learning may be utilized to generate a personalized message to the user's mother. For example, the personalized message may read "Hi Mom, I had such a nice vacation." Once the personalized message is generated, the personalized message may be sent from the smartphone to a smartphone of the identified contact. Where multiple contacts have been selected, the identification of an association between the user and the contact, the generating a personalized message and the sending of the message may be repeated for each of the selected contacts. This enables each selected contact, or at least a sub-group of the selected contacts, to receive a personalized message. In some examples, one or more of the selected contacts may receive the same personalized message, based, for example, on their association with the user. For example, all family members may get a first personalized message and all colleagues may get a second personalized message. The personalized message may be further based on any one or more of the other examples discussed herein.

A feature in the media item may be identified, and the personalized message may be generated further based on the identified feature. Continuing the above example, the photo may be of the user kayaking. The smartphone may utilize a computer vision algorithm in order to identify one or more features in the photo. In this example, the computer vision algorithm may recognize the kayak as an object in the photo. The identified object, in this example the kayak, may feed into the personalized message. For example, the personalized message may read "Hi Mom, I had a nice time kayaking on vacation." The personalized message may be further based on any one or more of the other examples discussed herein.

An initial message input by the user may be received at the computing device. The initial message and a first media item may be sent from the first computing device to an initial recipient, wherein the initial recipient is not part of the aforementioned group of one or more recipients. The aforementioned identified media item may be the same as the first media item, and generating the personalized message may be further based on the initial message sent to the recipient who is not part of the group. Continuing the above example, the user may send a media item, such as the aforementioned photo, to one or more users along with an initial message. For example, the user may send the aforementioned photo to their boyfriend along with the message "Missed you while I was away . . . the waves were big, but I enjoyed kayaking!" After sending the image and personalized message to their boyfriend, the user may then go on to select several contacts to send the same photo to. The personalized message to be used with a contact of the selected contacts may be based on the message that was initially sent to the user's boyfriend. For example, a generated personalized message to the user's mother may read "Hi Mom, I enjoyed kayaking in the big waves!" The "Hi Mom" may be generated based on an association between the user and the contact, and the "I enjoyed kayaking in the big waves" may be generated based on the initial message sent to the boyfriend. In some examples, more than one initial message may be analyzed in order to find a common theme, or to reinforce an identified theme. For example, in addition to sending a message to their boyfriend, the user may send the image and a message to a close friend. The message may read "Had a great vacation, but happy to be home. I enjoyed kayaking in the waves!" Analysis of this message may reinforce the "kayaking in the waves," which increases the likelihood of this phrase being included in a personalized message. The personalized message may be further based on any one or more of the other examples discussed herein.

One or more emotions in messages sent between the user and the recipient over a period of time may be identified, and generating the personalized message may be further based on at least one of the identified emotions. Continuing the above example, a message history between the user and a contact, such as the user's mother, may be analyzed. The analysis may comprise using natural language processing and machine learning to identify one or more emotions conveyed in the messages. Based on the analysis, it may be identified that the user will miss his mother while on vacation, and the identified emotion may be one of sadness. The identified emotion may feed into the personalized message. For example, the personalized message may read "Hi Mom, I had such a nice vacation. Looking forward to seeing you." The "Looking forward to seeing you" part of the message may be generated based on the emotion that was identified in previously sent messages. The period of time may comprise the entirety of a message history between two contacts. In other examples, the period of time may be a shorter period of time, such as a day, a week and/or a month of message history. The period of time may be based on a frequency of messaging between a user and a contact. For example, if the user and a contact message each other frequently, the period of time may be relatively short, such as a week. If, for example, the user and a contact message each other infrequently, the period of time may be relatively long, such as a few months. The period of time may also be based on the number of messages sent between a user and the contact. For example, it may be the period of time taken for the user and a contact to exchange 100 messages, or any other number of messages. The period of time may be chosen to encompass a number of messages that are needed for the result of the analysis to identify an emotion, wherein a confidence level associated with identification of the emotion is above a threshold amount, such as 50%, 75%, 90% or any other threshold amount. For example, the period of time may be a week, but if the identified emotion has an associated confidence level of 45%, the period of time may be extended to, for example, two weeks. If the resulting confidence level is still below a threshold amount, the period of time may be extended back further and so on, until the threshold confidence level is met. The personalized message may be further based on any one or more of the other examples discussed herein.

Generating the personalized message may be further based on at least one of a time, a location, and/or an item in a calendar. For example, if the current time is 11:00 pm, then the personalized message may read "Hi Mom, I had such a nice vacation. It's late—speak tomorrow." The "It's late—speak tomorrow" part of the message may be based on the current time. In other examples, the time may be based on the time that the media item was recorded and/or, if it is identified that the recipient is in a different time zone, the current time for the recipient. A media item may have a location associated with it, for example, a photo may have GPS coordinates recorded in exchangeable image file format (EXIF) data associated with the photo. If the user took a photo while on vacation, the personalized message may take advantage of the location data. For example, a personalized message may read "Hi Mom, I had such a nice vacation. I went to La Concha Bay." The "I went to La Concha Bay" part of the personalized message may be based on the location associated with the photo. In other examples, the location may be based on a current location identified by the computing device, a location of a wearable computing device being worn by the user and/or a location identified in association with the recipient of the message and media item. The personalized message may also be based on an item in a calendar. For example, a user may have a digital calendar connected to a profile associated with their smartphone. In an example, the user may have a calendar item indicating that they will meet their mother tomorrow at "Espresso World." In this example, the personalized message may read "Hi Mom, I had such a nice vacation. Looking forward to seeing you at Espresso World tomorrow." The "Looking forward to seeing you at Espresso World" part of the personalized message may be based on the calendar item. The personalized message may be further based on any one or more of the other examples discussed herein.

Generating the personalized message may be further based on the platform that the message is being sent to. For example, it may be identified that the user is sending the message to a contact via the LinkedIn platform. In this example, a relatively formal personalized message may be generated, such as "Dear Linsey, I have just arrived home from vacation. See you at work on Monday." In another example, if it is identified that the user is sending the message to a contact via TikTok, then a messaging style appropriate for that platform may be adopted, for example, by breaking up the personalized message into short segments and overlaying the segments over a video media item. The personalized message may be further based on any one or more of the other examples discussed herein.

Identifying the association between the user and the recipient may be further based on a frequency of interaction between the user and recipient over a time period. For example, if a user and a contact message each other frequently, it may be inferred that the relationship between the two is more casual than if a user and a contact message each other infrequently. For example, the personalized message may comprise more abbreviations if a user and a contact message each other frequently. In another example, the personalized message may be more formal if a user and a contact message each other infrequently. The identifying the association may be further based on any one or more of the other examples discussed herein.

Identifying the association between the user and the recipient is further based on an input of a relationship between the user and the recipient. For example, a settings section on a smartphone may enable a user to manually set their relationship with a contact, such as "Mother," "Boyfriend" or "Colleague." The identifying the association may be further based on any one or more of the other examples discussed herein.

Generating the personalized message may further comprise generating a personalized message based on a seed word and/or phrase input by the user. For example, a user may input a generic message, such as "had a nice vacation" and the personalized message may comprise amending the generic message. For example, a personalized message may read "Hi Mom, I had such a nice vacation." The "had a nice vacation" part of the personalized message may be based on the input message. In this example, the whole of the input message is repeated in the personalized message; however, in other examples only part of the input message may be repeated in the personalized message or the personalized message may not repeat any of the input message. In another example, if it is identified that, for example, the user is contacting a colleague, then a relatively informal message may be personalized to make it more formal. For example, if an input phrase is "had gr8 vacay," the personalized message may read "Dear Jane, I had a great vacation." The personalized message may be further based on any one or more of the other examples discussed herein.

The personalized message may be generated at a second computing device remote from the first computing device. For example, the media item may be transmitted from a user's smartphone to a server via a network such as the internet. The message personalization may take place at the server, and the message (and, optionally, the media item) may be sent, from the server, to a recipient. In another example, the personalized message may be sent back to the user's smartphone, and the personalized message and media item may be transmitted from the user's smartphone to a recipient.

In accordance with a second aspect of the disclosure, a method is provided for generating personalized media item recommendations. The method includes identifying a media item at a first computing device and identifying a feature in the media item. A group of one or more recipients to which one or more media items comprising the identified feature have been sent over a period of time is identified. A recommendation of at least one recipient to send the media item to is generated at the computing device and is based on the identified group. An example implementation of the method may comprise a user selecting a picture on their tablet device of, for example, a dog. The tablet device may utilize a computer vision algorithm in order to identify one or more features in the photo. In this example, a dog is identified. A database of photos, features and contacts may be maintained on the tablet device, and the database may be queried to identify which contacts the user has previously sent photos to in, for example, the last six months. Based on the identification of which contacts the user has previously sent dog photos to, a suggested list of contacts may be generated.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Figure 1:
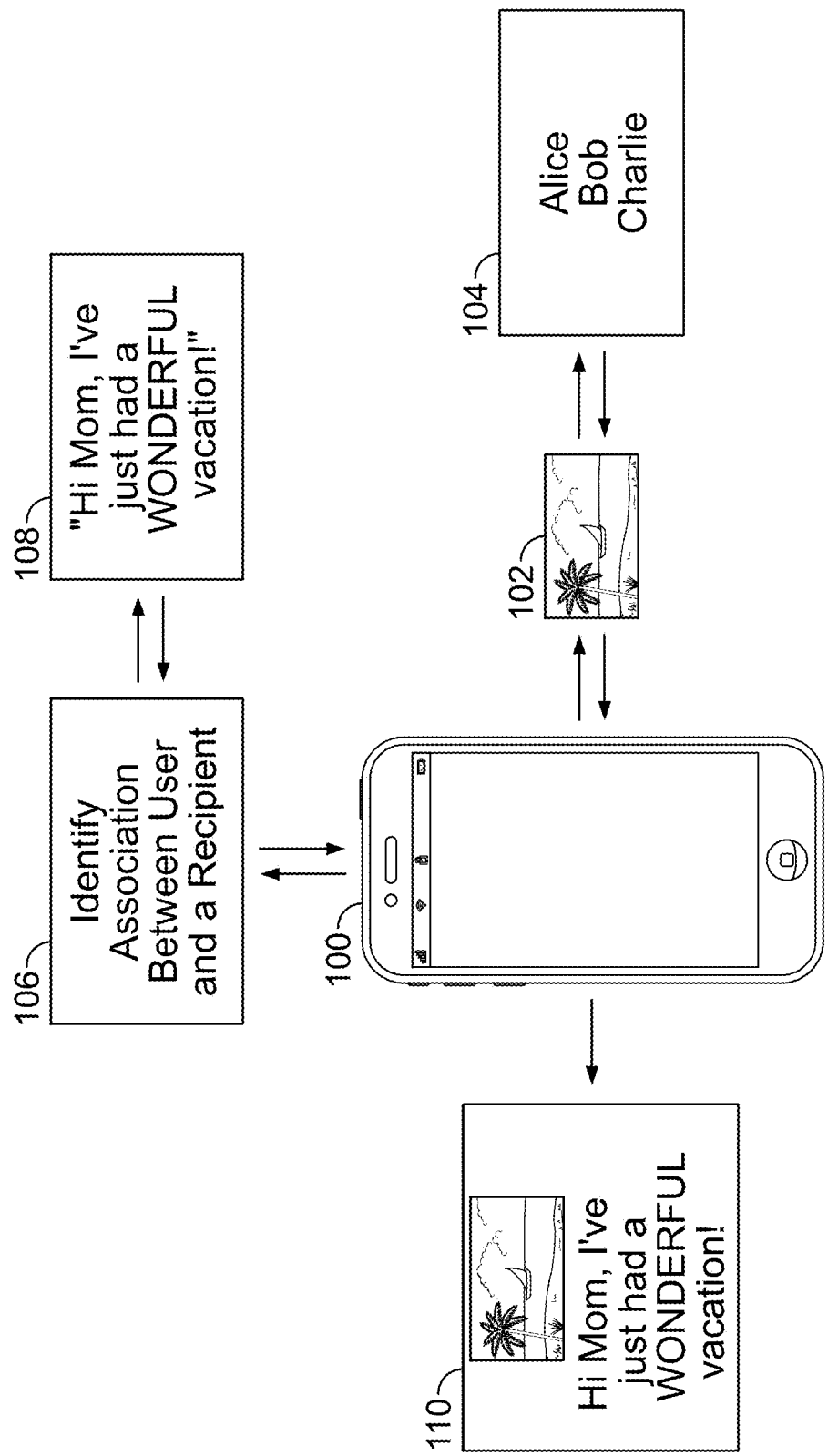
FIG. 1 shows an exemplary environment in which a personalized message is generated, in accordance with some embodiments of the disclosure.

Systems and methods are described herein for generating personalized messages. As referred to herein, personalizing a message comprises any action related to personalizing a message such as generating the words of a message, formatting the message (e.g., short sentences/paragraphs), display of the message (e.g., overlaid on the media item, below the media item) and/or the format of the message itself (e.g., text, audio, emoji, video). A typical example may include displaying a personalized text message beneath a media item; other examples include overlaying segments of a message over the media item and generating a personalized video of the user speaking a message that is displayed beneath a media item. Personalization also includes generating a message and/or modifying an existing message such that there is link between an intended recipient and the message content. For example, personalization could refer to including the intended recipient's name and/or reflecting a historic message style used with the intended recipient. It could also include reflecting a historic message content and/or context with the intended recipient. For example, if it was identified that a user and an intended recipient anticipated missing each other while the user was on vacation, personalization could comprise including the phrase "missed you" in a message. Personalization can apply to a single message or a group of messages. For example, if a user sent a media item to a group of colleagues, then the personalization may comprise using a formal writing style for the message sent to the group of colleagues.

"Message" is a broad term that covers one or more words and or actions that could convey a meaning from a user to a recipient. Typically, a message may comprise a text message having one or more words. A message similarly includes an audio message, wherein a message is spoken by a user and/or generated by a computer. A message may also be a video message wherein a user speaks and/or signs (using sign language) a message, which again may also be generated by a computer. A message could include a gif, an emoji and/or an animated emoji and/or memoji.

A media item can comprise any media content. Media content includes a photo, a video, audio and/or any other media content. Video includes audiovisual content. Audio includes audio-only content, such as speaking. The message and the media item may be of the same format. For example, a user may wish to share a video of their vacation with a contact and may wish to include a personalized video of themselves speaking a message. The personalized parts of the video may be generated by leveraging artificial intelligence.

A user is any person or people using the computing device. A computing device may implement a system of profiles to help distinguish between physical users. However, where multiple physical users use the same computing device without a way of identifying each of them (i.e., without different user profiles), the systems and methods described herein may treat the multiple physical users as a single "user."

"Association" is a broad term that covers any type of connection between a user and a contact. For example, it could be a relationship, such as "father," "wife," "girlfriend," "friend" and/or "colleague." The relationship may be identified, for example, based on natural language processing of a historic message exchange between the user and the contact. In another example, the association could be based on the format and/or style of historic messages sent between the user and the contact. In another example, the association could be the type of relationship between a user and a contact. For example, the type of relationship may be "casual" or "formal." The connection between a user and a contact may, for example, be an emotional connection. For example, analysis of messages between the user and a contact may indicate that they will miss each other while one of them is away. In another example, the association might be an emotional association between the user and a contact. The association may, for example, be identified via performing natural language processing on historic messages between the user and a contact. An identified association between a user and a contact may be stored at a computing device or with a profile associated with the user, such that the identified association can be accessed by a computing device at a later time, and the identification step does not need to be performed each time the user sends a message to a contact.

The steps of identifying an association between a user and a recipient and the generating a personalized message described herein may be integrated into one or more applications. In other examples, they may be provided via an application programming interface (API) and, for example, a remote server, such that existing applications can call the functionality from within the application.

The disclosed methods and systems may be implemented on a computing device. As referred to herein, the computing device can be any device comprising a processor and memory, for example, a television, a smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a webTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1 shows an exemplary environment in which a personalized message is generated, in accordance with some embodiments of the disclosure. A user identifies a media item at a computing device such as, for example, smartphone 100. The user may identify a media item via, for example, a "Photos" application on their smartphone 100. The user may open the "Photos" application and be presented with a plurality of photos. The user may select a photo 102 which they wish to send to a one or more contacts. The user may identify the contacts they wish to send the photo 102 to, by selecting a "share" icon within the "Photos" application. On selecting the "share" icon, the user may be presented with a list of contacts to send the photo 102 to. In another example, on selecting the share icon, a phonebook application may be opened, and a user may select one or more contacts to send the photo 102 to via the phonebook application. In this example, the user selects the contacts "Alice," "Bob" and "Charlie" 104 to send the photo 102 to. The user may also identify a platform to send the media item via, for example, via WhatsApp. The user may identify the platform as a separate step, or the contacts may already have a platform associated with them based on historic usage patterns. At 106, an association between the user and the recipient "Alice" is identified (or predicted). Identifying an association between the user and the recipient may comprise generating a score that is indicative of the relationship between the user and the recipient. In some examples, the association is identified based on a historic frequency of communication between the user and the recipient, the platforms used to communicate, information stored with the contact detail (for example in the phonebook), user input and/or via natural language processing of historic messages between the user and the recipient. These are described in more detail below. At 108, a personalized message is generated. In this example, the personalized message is "Hi Mom, I've just had a WONDERFUL vacation!" The personalized message is based on the identified association between the user and the contact. In this example, the association between the user and Alice is son and mother. This is reflected in the personalized message 108 starting "Hi Mom." The message generation may be performed with a language model, such as a statistical language model and/or a neural language model. A statistical language model may use statistical techniques such as N-grams, Hidden Markov Models and/or linguistic rules. A neural language model may use different kinds of neural networks to model language. The language model may be an unsupervised language model. A language model such as the Generative Pre-trained Transformer (GPT, GPT-2, GPT-3), the Universal Language Model Fine-tuning (ULMFiT) and/or the Bidirectional Encoder Representation from Transformers (BERT) language model may also be used. The models may be pre-trained on an unlabeled text dataset, with a self-supervised task. The text dataset may be any known text dataset or may be a text dataset comprising typical messages sent between people. The photo 102 and the personalized message 108 are sent 110 from the smartphone 100 to the recipient, for example a recipient's smartphone. The photo 102 and message 108 may be sent via a network, such as a cellular network and/or the internet. The message may be sent in a protocol that is compatible with an identified messaging app, such as WhatsApp, and/or may be sent in a generic protocol that may be interpreted by many messaging apps. In addition to a specific messaging app, any other form of digital communication means may be used, for example an email, a Multimedia Message Service message, via the Signal app, via a platform such as Facebook, TikTok and/or Instagram. The user may send the message via an application associated with the platform or by logging in to the platform via an internet browser. In some examples, not shown, the identifying the association 106, the personalized message generation 108 and the sending 110 of the media item and message may be performed for the additional selected contacts 104, in this example, "Bob" and "Charlie." This enables each selected contact, or at least a sub-group of the selected contacts, to receive a personalized message. In some examples, one or more of the selected contacts may receive the same personalized message, based, for example, on their association with the user. For example, all family members may get a first personalized message and all colleagues may get a second personalized message.

Figure 2:
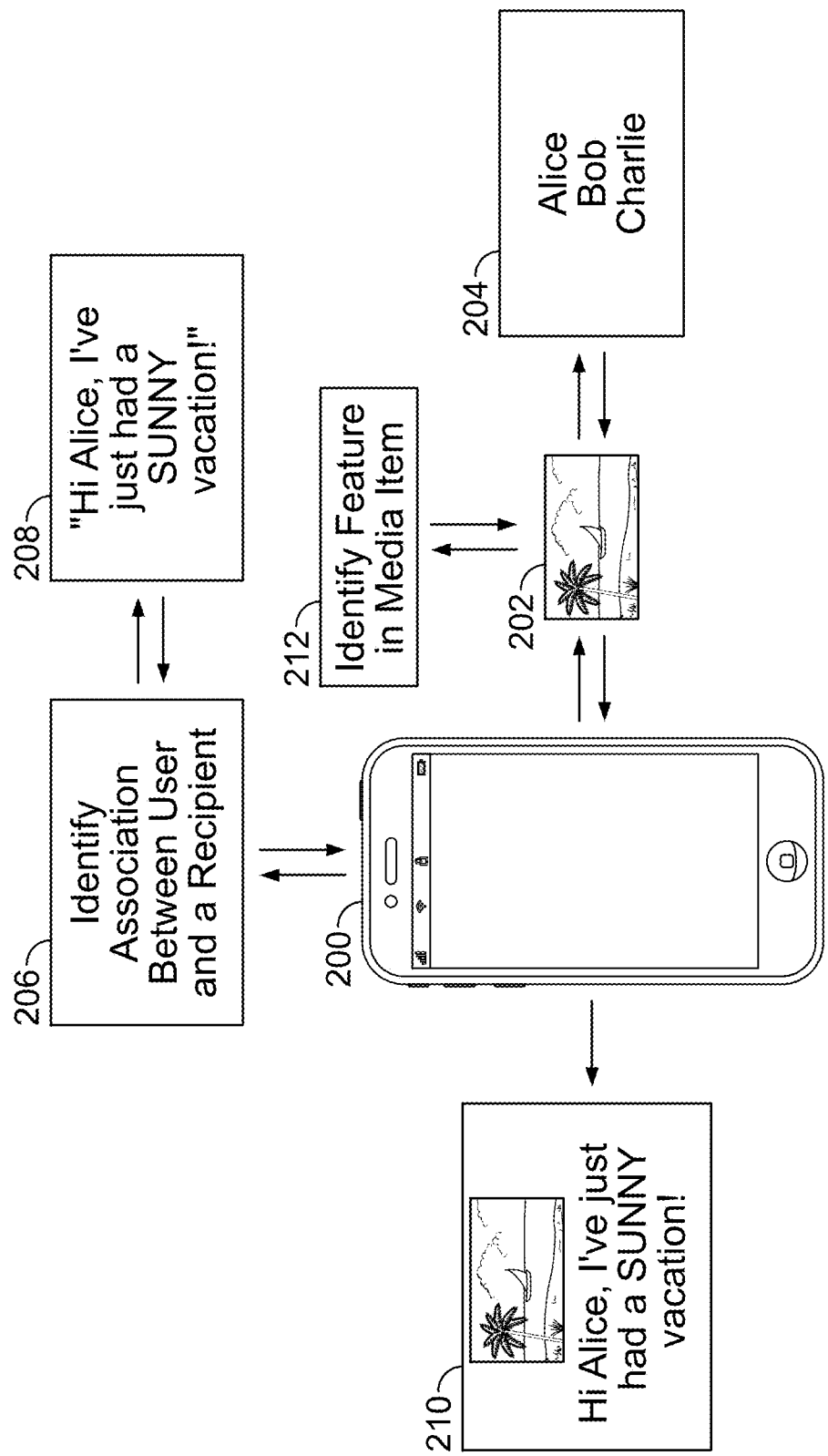
FIG. 2 shows another exemplary environment in which a personalized message is generated, in accordance with some embodiments of the disclosure.

FIG. 2 shows another exemplary environment in which a personalized message is generated, in accordance with some embodiments of the disclosure. The exemplary environment of FIG. 2 is broadly similar to that of FIG. 1. As with FIG. 1, a user identifies a media item at a smartphone 200. In this example, a photo 202 is selected by the user. In this example, the user selects the contacts "Alice," "Bob" and "Charlie" 204 to send the photo 202 to. Again, an association between the user and recipient is identified 206, and a personalized message is generated 208. The photo 202 and the personalized message 208 are sent 210 to a selected contact from the smartphone 200. In addition to the environment described in connection with FIG. 1, a feature is identified 212 in the photo 202. A computer vision algorithm may be utilized in order to identify one or more features in the photo. An example of such a computer vision algorithm is Apple's Vision Framework. The computer vision algorithm enables tasks such as face detection, the detection of landmarks in context, object detection and body pose detection to be carried out. The algorithm may be trained on existing, labelled datasets and/or on a user's media items. Other computer vision algorithms for enabling image detection include Google Cloud Vision, Microsoft Computer Vision, OpenCV, Amazon Rekognition, IBM Watson Visual Recognition, Clarifai, Azure Face, Azure Custom Vision and/or SimpleCV. Any one, or combination, of these computer vision algorithms may be used to detect features in a media item. In some examples, the metadata on which a personalized message may be based already exists on the computing device. For example, an Apple iOS device utilizes image recognition and analysis technologies to process pictures and videos in order to determine people and/or objects that are present in a media item (e.g., to allow users to find all the pictures that contain a specific person). The personalized message can be based on this existing metadata, which is already associated with a media item. In addition to recognizing features in still images, feature recognition may be similarly applied to videos and/or audio clips. The personalized message may be based on one or more of the identified features. In this example, the personalized message reads "Hi Alice, I've just had a SUNNY vacation!" The association between the user and the recipient has been identified as "casual," exemplified by the message starting with "Hi." In addition, the sun has been identified 212 in the photo 202. This is reflected in the personalized message referring to a "SUNNY vacation!" As before, in some examples, not shown, the identifying the association 206, the personalized message generation 208 and the sending 210 of the media item and message may be performed for the additional selected contacts 204, in this example, "Bob" and "Charlie."

In a variation on the environment described in connection with FIG. 2, closed-caption (subtitle) data may be analyzed in order to provide context to a media item. The closed-caption data may be embedded in the media item and may be analyzed via text recognition. In another example, the closed-caption data may be provided in a separate file that is associated with the media item. In some examples, closed-caption data may be automatically generated by a platform that a user uses to share media items. For example, if a user shares a media item via Instagram, then a closed-caption of the media item may be automatically generated. If a user subsequently shares the same media item, then the previously generated closed-caption(s) may be utilized to provide context to the media item. Whether a media item is the same may be identified, for example, by calculating a hash of the media item and comparing the calculated hash to previously calculated hashes.

Figure 3:
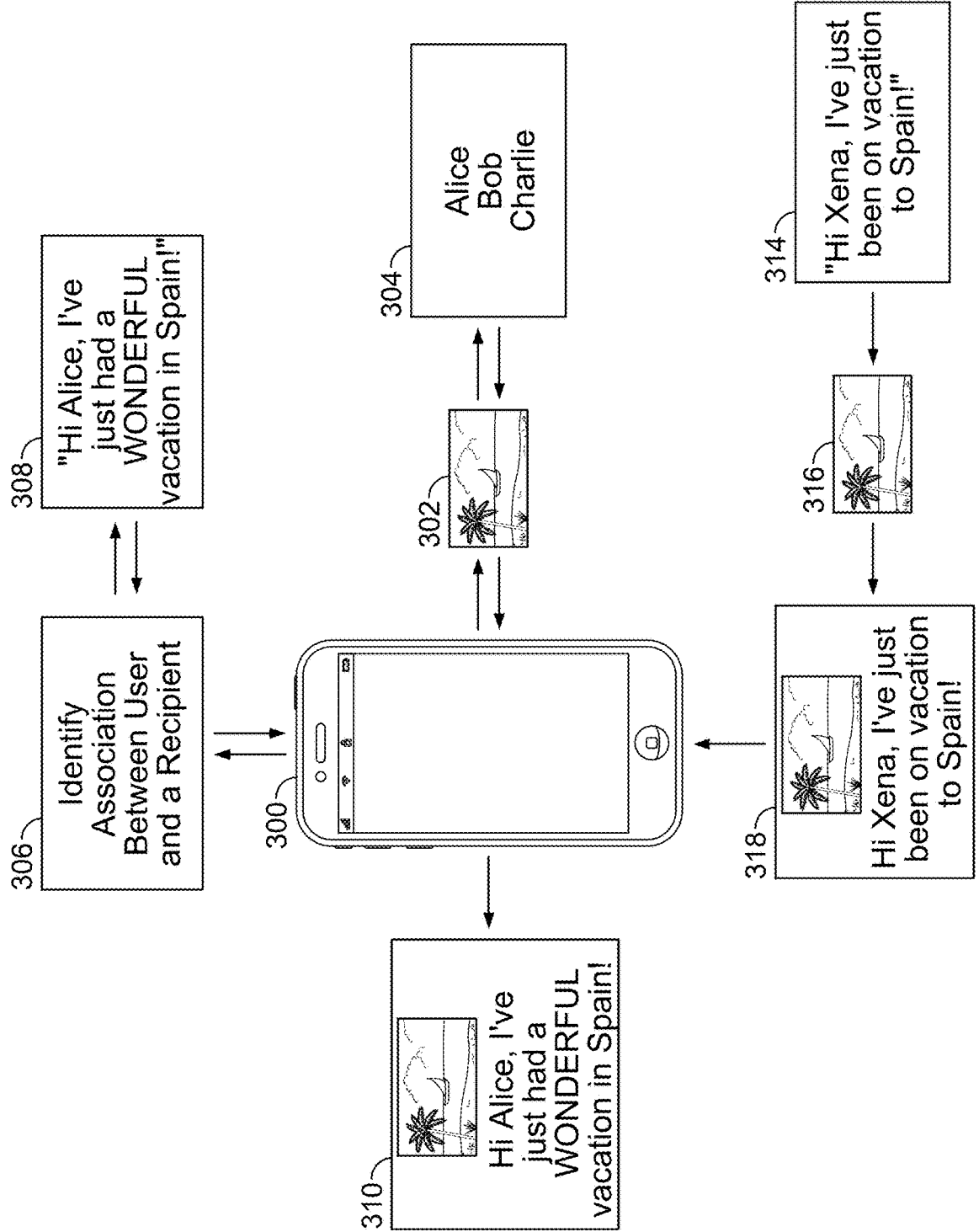
FIG. 3 shows another exemplary environment in which a personalized message is generated, in accordance with some embodiments of the disclosure.

FIG. 3 shows another exemplary environment in which a personalized message is generated, in accordance with some embodiments of the disclosure. The exemplary environment of FIG. 3 is broadly similar to those of FIGS. 1 and 2. As with FIG. 1, a user identifies a media item at a smartphone 300. In this example, a photo 302 is selected by the user. In this example, the user selects the contacts "Alice," "Bob" and "Charlie" 304 to send the photo 302 to. Again, an association between the user and recipient is identified 306, and a personalized message is generated 308. The photo 302 and the personalized message 308 are sent 310 to a selected contact from the smartphone 300. In addition, the personalized message may be generated based on an initial message and media item sent by the user. In this example, the user inputs a message 314 at their smartphone 300. The example message reads "Hi Xena, I've just been on vacation to Spain!" The user selects a photo 316 to send to Xena and sends 318 the message and the photo to Xena. When the same photo 302 as the photo 316 that was sent to Xena is subsequently selected, historic messages associated with the photo may be identified. Whether or not a photo is the same may be identified via, for example, calculating a hash of the photo 302 and comparing the calculated hash to a hash of previously sent photos. In this example, when the user selects photo 302, it is identified that the same photo 316 was sent to another contact. The message 314 that was previously sent with the photo 316 is accessed, and the smartphone may use natural language processing to identify a general message from the initial message that was sent to Xena, for example, "vacation to Spain." This is then used as the basis for generating the personalized message 308. In some examples, a confidence level may be generated at the same time, and the initial message 314 may be used as a basis for generating a personalized message 308 only if the confidence level is at or above a threshold value. A threshold value could be an appropriate value, such as 50%, 75%, or 95%. In this example, the personalized message reads "Hi Alice, I've just had a WONDERFUL vacation in Spain!" The "vacation in Spain" part of the personalized message may be based on a general message that was identified in the message that was sent to Xena. As before, the personalized message 308 and the selected photo 302 are sent 310 to the selected contact from the smartphone 300. Although FIG. 3 shows a single initial message 314, if the photo 316 (or media item) has been sent to multiple contacts, along with a message, then those messages may also be analyzed in order to increase a confidence level in the identified general message. As before, in some examples, not shown, the identifying the association 306, the personalized message generation 308 and the sending 310 of the media item and message may be performed for the additional selected contacts 304, in this example, "Bob" and "Charlie." The method described in connection with FIG. 3 may, for example, be combined with the method described in connection with FIG. 2 such that the personalized message may be based on both a feature identified in a media item and an initial message sent to a contact, such that the personalized message reflects a general message and an identified feature.

Figure 4A:
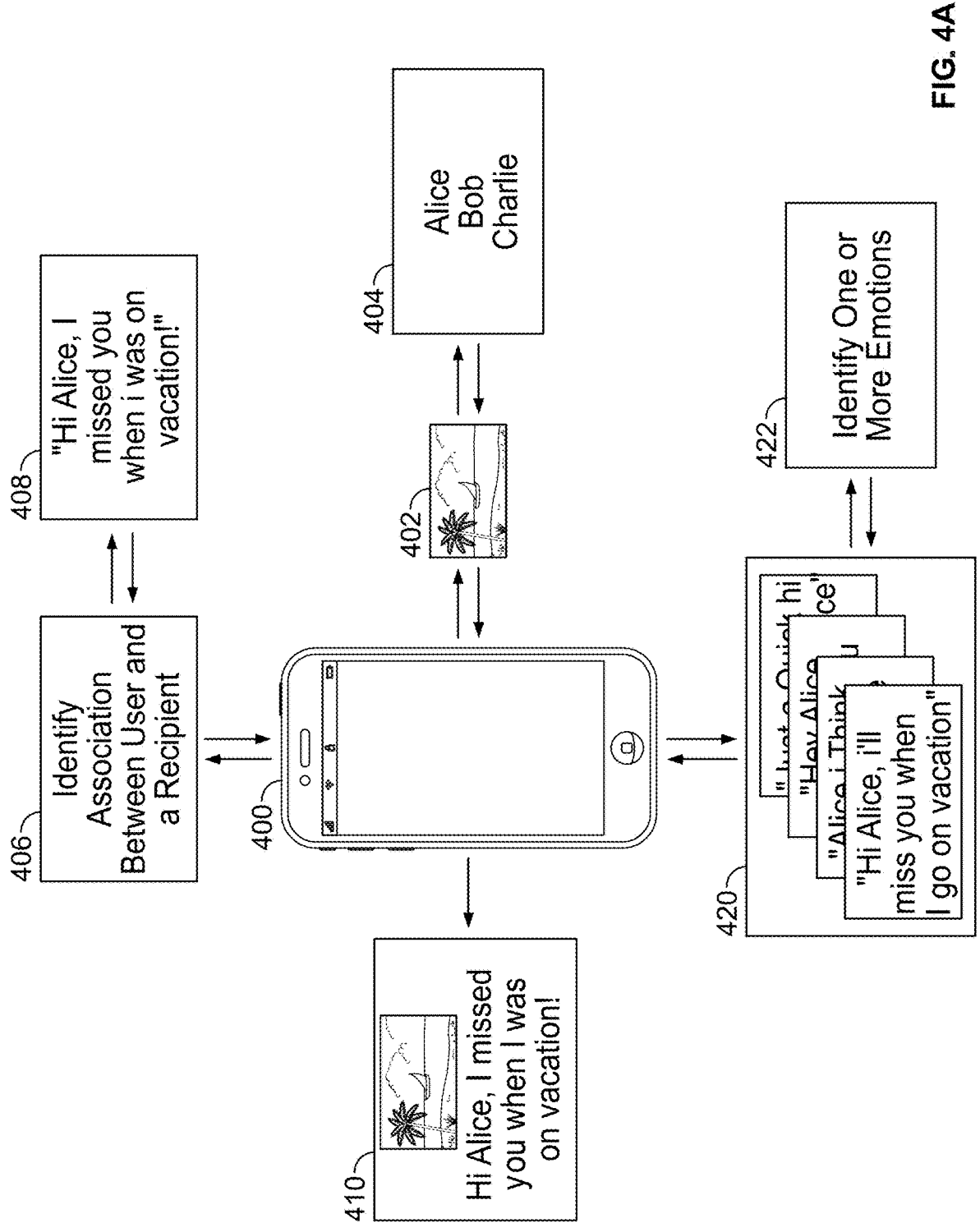
FIG. 4A shows another exemplary environment in which a personalized message is generated, in accordance with some embodiments of the disclosure.

FIG. 4A shows another exemplary environment in which a personalized message is generated, in accordance with some embodiments of the disclosure. The exemplary environment of FIG. 4A is broadly similar to those of FIGS. 1, 2 and 3. As with FIG. 1, a user identifies a media item at a smartphone 400. In this example, a photo 402 is selected by the user. In this example, the user selects the contacts "Alice," "Bob" and "Charlie" 404 to send the photo 402 to. Again, an association between the user and recipient is identified 406, and a personalized message is generated 408. The photo 402 and the personalized message 408 are sent 410 to a selected contact from the smartphone 400. In addition, the personalized message may be generated based on one or more identified emotions. In this example, a message history 420 between a user and a selected contact is analyzed to identify one or more emotions 422. The analysis may comprise using natural language processing and machine learning to identify one or more emotions conveyed in the messages. In other examples, the emotion detection may comprise identifying keywords, and the sentiment associated with the keywords, in the messages. The models may be trained, for example, on the WordNet database. In another example, a multi-layered neural network may be trained to identify emotions in historic messages. In some examples, a confidence level may be generated at the same time, and the identified emotion 422 may be used as a basis for generating a personalized message 408 only if the confidence level is at or above a threshold value. A threshold value could be an appropriate value, such as 50%, 75%, or 95%. In this example, the identified emotion 422 is used as the basis for generating the personalized message 408. In this example, the personalized message reads "Hi Alice, I missed you when I was on vacation." The "I missed you" part of the personalized message may be based on the identified emotion 422. As before, the personalized message 408 and the selected photo 402 are sent 410 to the selected contact from the smartphone 400. Alternatively, the identified emotion may be used as a basis for identifying an association between the user and a recipient such that the association is "miss each other." The personalized message may then be based on this association. In addition, the identified emotion may be stored at the computing device or with a profile associated with the user, so that the message history does not need to be reanalyzed to identify an emotion each time a personalized message is generated. In some examples, the identified emotion may be stored for a period of time, before a message history between a user and a contact is reanalyzed. This period of time may be a fixed period of time, such as a week, or may be a variable period of time based, for example, on a frequency of messaging between the user and the contact. For example, if the user messages a contact frequently, the emotions between the user and the contact are more likely to vary in a short space of time, so the time period may be shorter, such as a day or a few hours. The identified emotion may be stored with a profile associated with the user, such that if a user logs on to a different computing device, then the identified emotion can be accessed at that computing device and used for generating a personalized message. In some examples, not shown, the identifying the association 406, the personalized message generation 408 and the sending 410 of the media item and message may be performed for the additional selected contacts 404, in this example, "Bob" and "Charlie." In addition, a message history 420 between a user and a selected contact (i.e., "Bob" and "Charlie" in this example) may be analyzed to identify one or more emotions 422, on which the personalized message 408 is based for those contacts. The method described in connection with FIG. 4 may, for example, be combined with the methods described in connection with FIGS. 2 and/or 3 such that the personalized message may be based on an identified emotion and at least one of a feature identified in a media item and/or an initial message sent to a contact, such that the personalized message reflects the identified emotion and at least one of a general message and/or an identified feature.

Figure 4B:
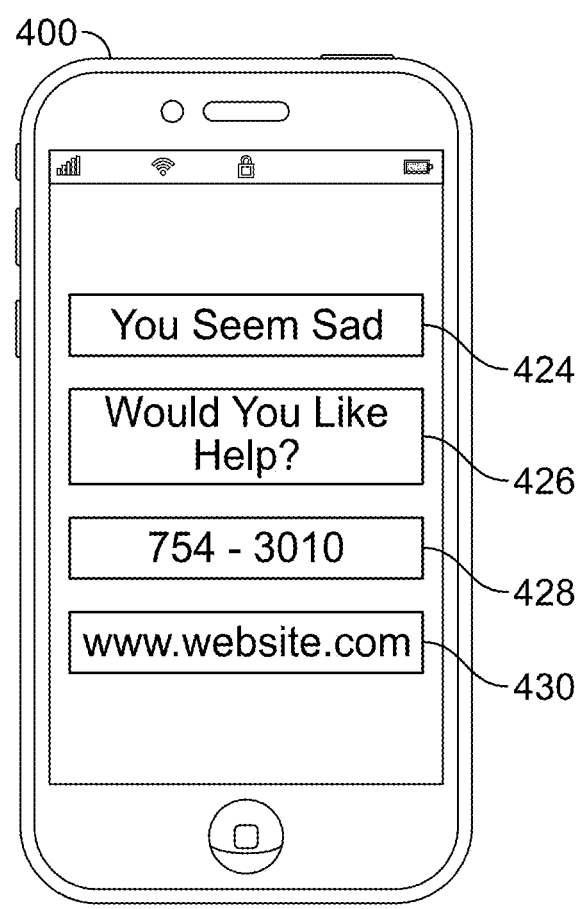
FIG. 4B shows an exemplary environment in which a user interface for displaying an identified emotion is generated.

FIG. 4B shows an exemplary environment in which a user interface for displaying an identified emotion is generated. Once an emotion is identified, a smartphone 400 may display one or messages (or banners) 424, 426, 428, 430 associated with the identified emotion. For example, an interface of the smartphone 400 may generate for display a banner identifying the emotion. In this example, the banner 424 displays the message "You seem sad." In addition to a message identifying the emotion, an interface of the smartphone may generate for display a banner that displays a message associated with the emotion. In this example, the banner 426 displays the message "Would you like help?" Another banner may be displayed indicating a phone number 428 that a user can call. For example, the phone number may be a Samaritan helpline. A banner may be displayed indicating a website 430 that the recipient can access. For example, the website may be a website that provides information associated with the emotion, such as where to find help if you feel sad. Any of the above banners may be via a messaging app, a platform app, a notification or any other interface component. If a user clicks on a banner and/or the notification (and/or responds to a banner and/or notification via a voice command), an application associated with the identified emotion may be opened. For example, if the identified emotion is "sad" then a mental health awareness application may be opened or, for example, if the identified emotion is "angry" then an anger management application may be opened. If the user does not have a relevant application installed, the user may be directed towards a relevant application to download via, for example, an application store.

Figure 5A:
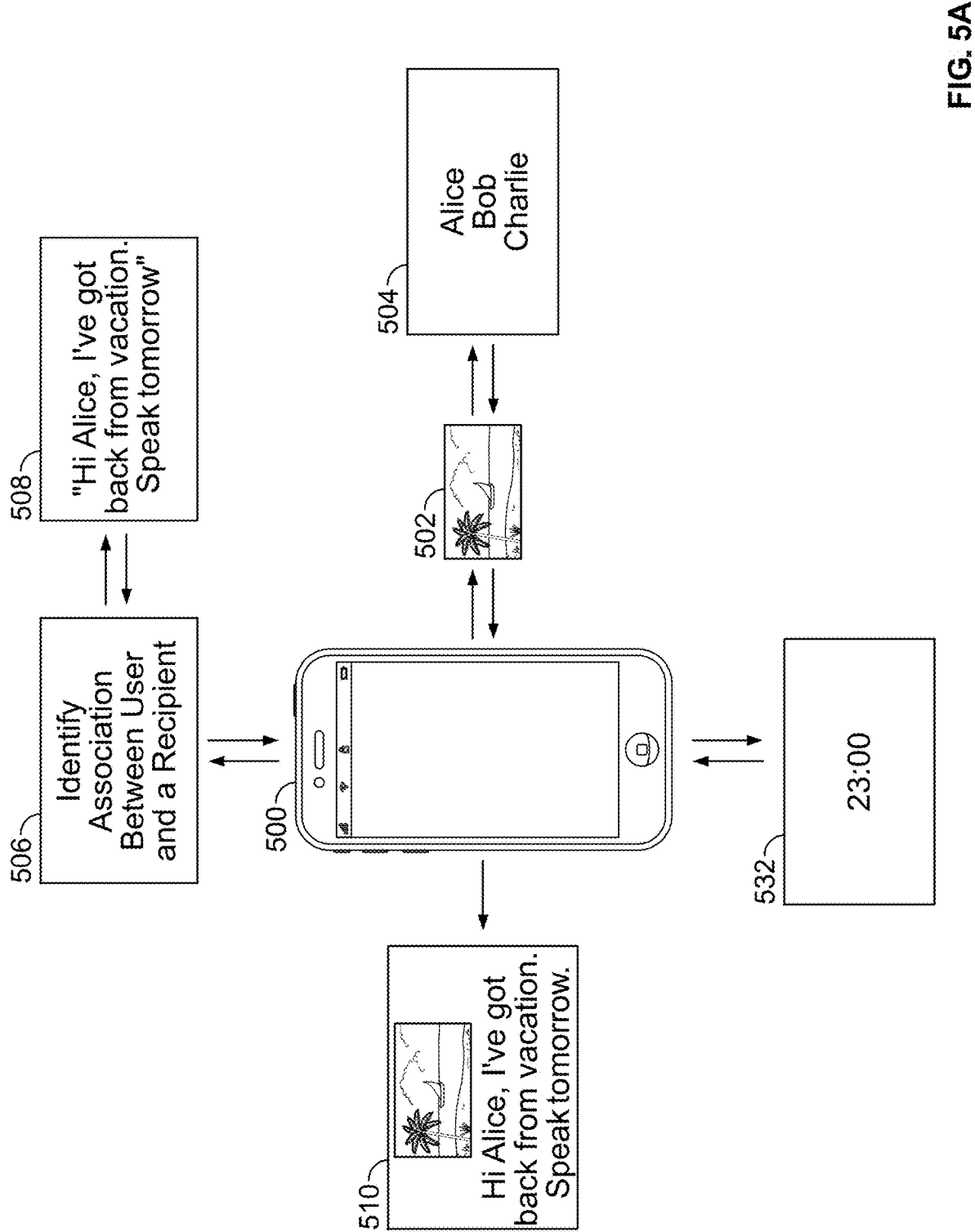
FIG. 5A shows another exemplary environment in which a personalized message is generated, in accordance with some embodiments of the disclosure.

FIG. 5A shows another exemplary environment in which a personalized message is generated, in accordance with some embodiments of the disclosure. The exemplary environment of FIG. 5A is broadly similar to those of FIGS. 1, 2, 3 and 4A. As with FIG. 1, a user identifies a media item at a smartphone 500. In this example, a photo 502 is selected by the user. In this example, the user selects the contacts "Alice," "Bob" and "Charlie" 504 to send the photo 502 to. Again, an association between the user and recipient is identified 506, and a personalized message is generated 508. The photo 502 and the personalized message 508 are sent 510 to a selected contact from the smartphone 500. In addition, the personalized message 508 may be based on an identified time 532. The time may be a time associated with the media item (for example, the time at which the photo 502 was taken), a time associated with the user and/or smartphone 500 (i.e., the current time) and/or a time associated with a contact to which the personalized message 508 and photo 502 will be sent 510 (e.g., a different time zone). In this example, the time 532 is the time associated with the smartphone. In this example, the time is 23:00 and the personalized message is "Hi Alice, I've got back from vacation. Speak tomorrow." The "Speak tomorrow" part of the message may be based on the time being 23:00 (i.e., that it is too late to speak). As before, the personalized message 508 and the selected photo 502 are sent 510 to the selected contact from the smartphone 500. In some examples, not shown, the identifying the association 506, the personalized message generation 508 and the sending 510 of the media item and message may be performed for the additional selected contacts 504, in this example, "Bob" and "Charlie." The method described in connection with FIG. 5A may, for example, be combined with the methods described in connection with FIGS. 2 and/or 3 and/or 4A, such that the personalized message may be based on an identified time and at least one of a feature identified in a media item and/or an initial message sent to a contact and/or an identified emotion, such that the personalized message reflects the identified time and at least one of a general message and/or an identified feature and/or an identified emotion.

Figure 5B:
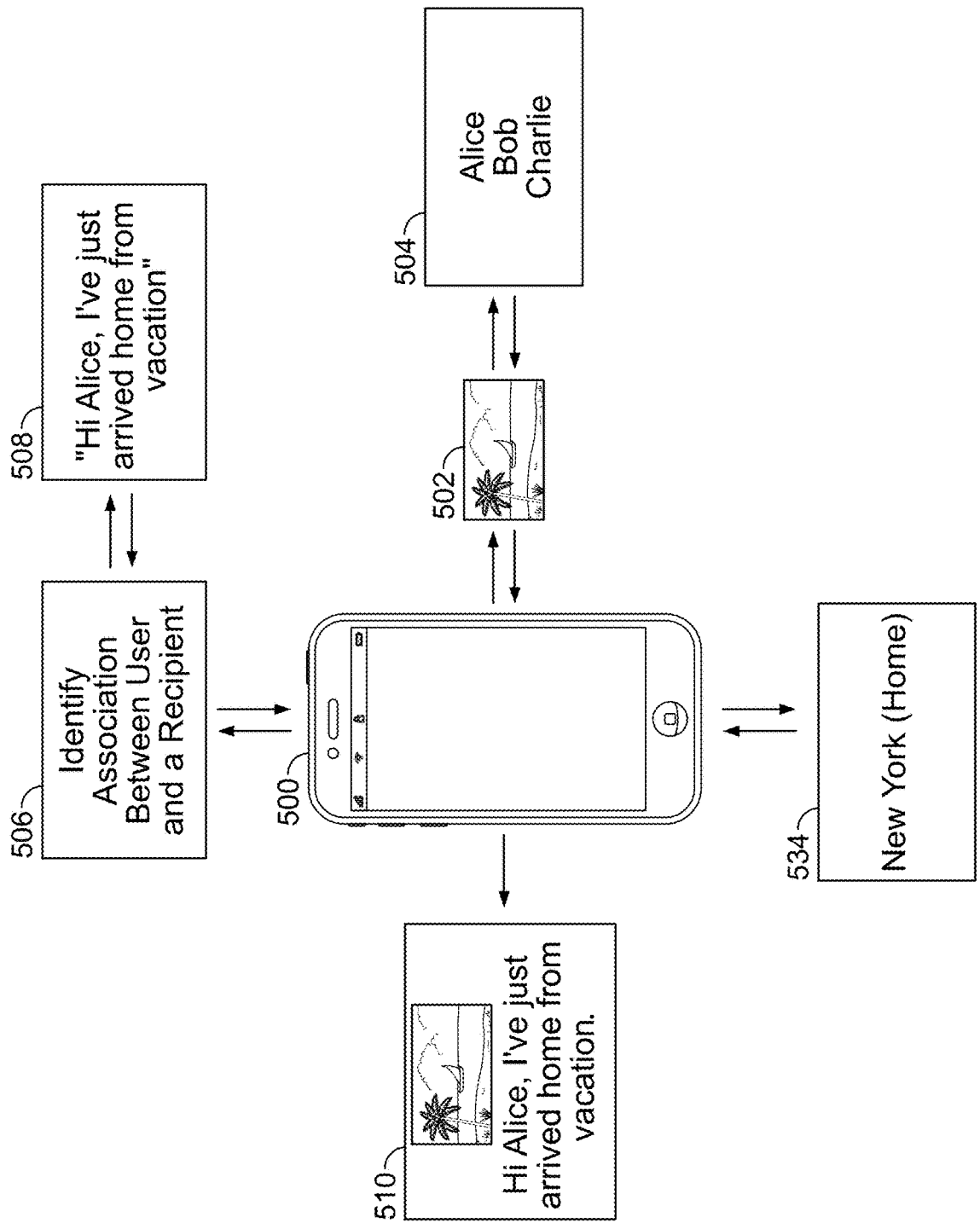
FIG. 5B shows another exemplary environment in which a personalized message is generated, in accordance with some embodiments of the disclosure.

FIG. 5B shows another exemplary environment in which a personalized message is generated, in accordance with some embodiments of the disclosure. The exemplary environment of FIG. 5B is broadly similar to those of FIGS. 1, 2, 3, 4A and 5A. As with FIG. 1, a user identifies a media item at a smartphone 500. In this example, a photo 502 is selected by the user. In this example, the user selects the contacts "Alice," "Bob" and "Charlie" 504 to send the photo 502 to. Again, an association between the user and recipient is identified 506, and a personalized message is generated 508. The photo 502 and the personalized message 508 are sent 510 to a selected contact from the smartphone 500. In addition, the personalized message 508 may be based on an identified location 534. The location may be a location associated with the media item (for example, the location at which the photo 502 was taken), a location associated with the user and/or smartphone 500 (i.e., where the smartphone is located) and/or a location associated with a contact to which the personalized message 508 and photo 502 will be sent 510. A media item may have GPS coordinates recorded in metadata, such as exchangeable image file format (EXIF) data, associated with the media item. Location data may accessed by a computing device via a satellite navigation system such as GPS, GLONAS, BeiDou and/or Galileo. In this example, the location 534 is the location associated with the smartphone. In this example, the location is New York, and the personalized message is "Hi Alice, I've just arrived home from vacation" The "arrived home" part of the message may be based on the location being New York (i.e., where the user lives). As before, the personalized message 508 and the selected photo 502 are sent 510 to the selected contact from the smartphone 500. In some examples, not shown, the identifying the association 506, the personalized message generation 508 and the sending 510 of the media item and message may be performed for the additional selected contacts 504, in this example, "Bob" and "Charlie." The method described in connection with FIG. 5B may, for example, be combined with the methods described in connection with FIGS. 2 and/or 3 and/or 4A and/or 5A, such that the personalized message may be based on an identified location and at least one of a feature identified in a media item and/or an initial message sent to a contact and/or an identified emotion and/or a time, such that the personalized message reflects the identified location and at least one of a general message and/or an identified feature and/or an identified emotion and/or a time.

Figure 5C:
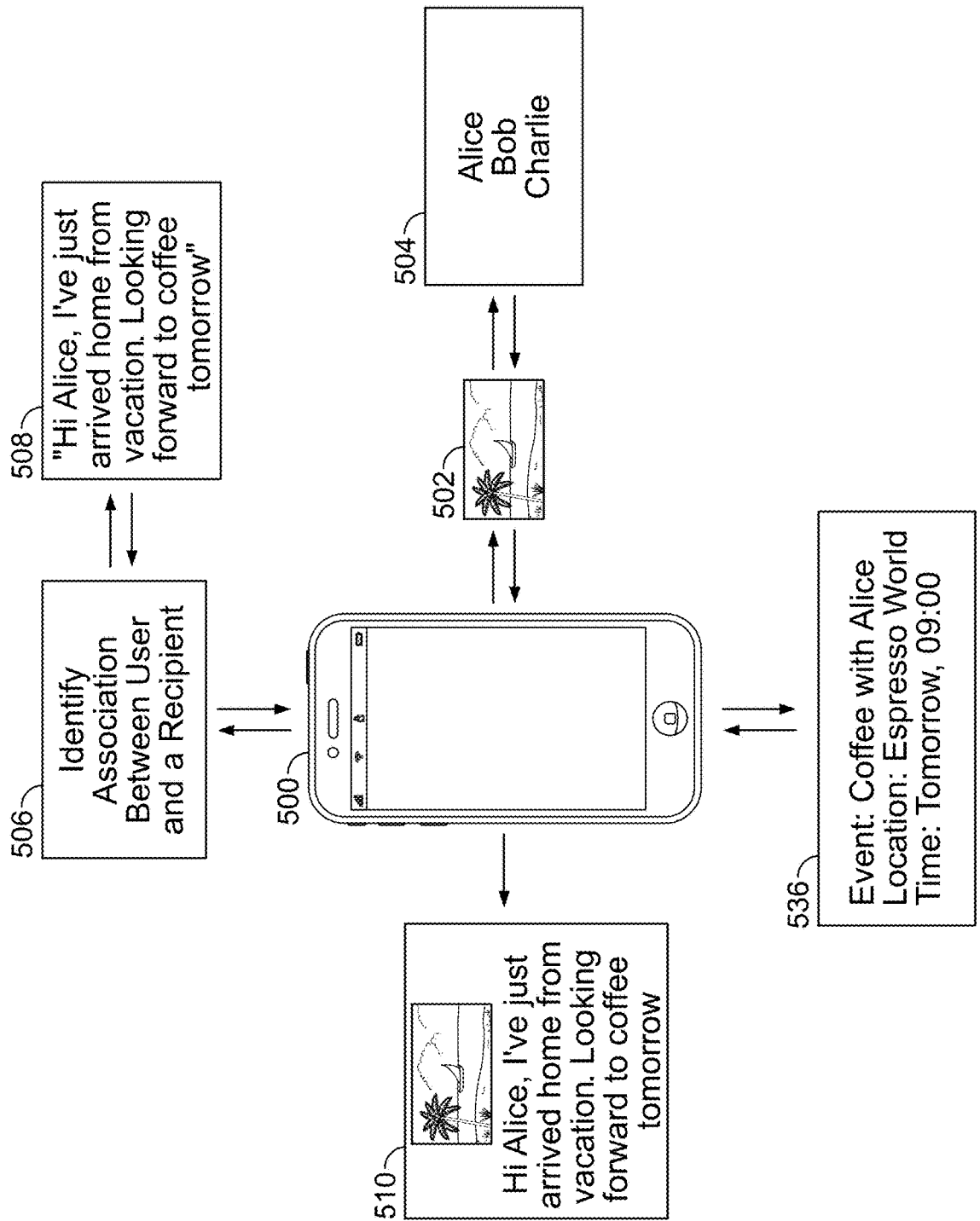
FIG. 5C shows another exemplary environment in which a personalized message is generated, in accordance with some embodiments of the disclosure.

FIG. 5C shows another exemplary environment in which a personalized message is generated, in accordance with some embodiments of the disclosure. The exemplary environment of FIG. 5C is broadly similar to those of FIGS. 1, 2, 3, 4A, 5A and 5B. As with FIG. 1, a user identifies a media item at a smartphone 500. In this example, a photo 502 is selected by the user. In this example, the user selects the contacts "Alice," "Bob" and "Charlie" 504 to send the photo 502 to. Again, an association between the user and recipient is identified 506, and a personalized message is generated 508. The photo 502 and the personalized message 508 are sent 510 to a selected contact from the smartphone 500. In addition, the personalized message may be based on an identified calendar event 536. The calendar event may be accessed from a calendar that is stored locally in a memory of the computing device. In another example, the calendar may be stored on a server remote from the computing device, and the calendar may be synchronized with a calendar on the computing device. The user may be logged on to the computing device via a user profile, and the calendar may be associated with the user profile. The personalized message 508 may be based on any part of a calendar event, for example an event title, an event duration, an event start time, an event end time, an event time zone, whether the event repeats, contacts and/or people associated with the event, a video conferencing platform associated with the event, a location associated with the event, a reminder associated with the event, a color associated with the event, a description associated with the event and/or an attachment, such as a document, associated with the event. Any part of the event may be analyzed via natural language processing, including the contents of any attachment associated with the event. In this example, the event title is "Coffee with Alice," the event location is "Espresso World" and the time is "Tomorrow, 09:00." In this example, the personalized message is "Hi Alice, I've just arrived home from vacation. Looking forward to coffee tomorrow." The "Looking forward to coffee tomorrow" part of the message is based on the calendar invite. As before, the personalized message 508 and the selected photo 502 are sent 510 to the selected contact from the smartphone 500. In some examples, not shown, the identifying the association 506, the personalized message generation 508 and the sending 510 of the media item and message may be performed for the additional selected contacts 504, in this example, "Bob" and "Charlie." The method described in connection with FIG. 5C may, for example, be combined with the methods described in connection with FIGS. 2 and/or 3 and/or 4A and/or 5A and/or 5B, such that the personalized message may be based on an identified calendar invite and at least one of a feature identified in a media item and/or an initial message sent to a contact and/or an identified emotion and/or a time and/or a location, such that the personalized message reflects the identified calendar invite and at least one of a general message and/or an identified feature and/or an identified emotion and/or a time and/or a location.

Figure 6:
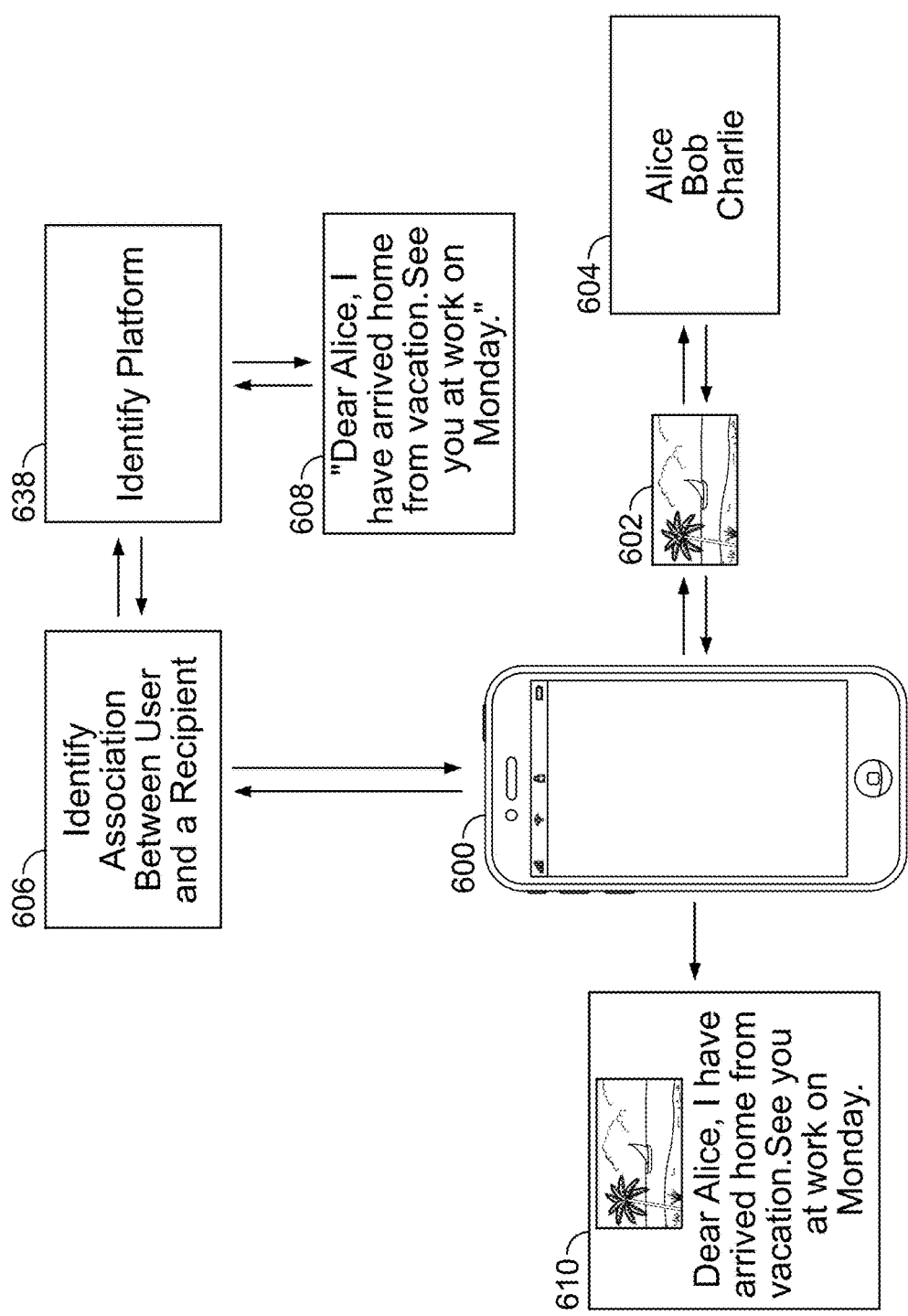
FIG. 6 shows another exemplary environment in which a personalized message is generated, in accordance with some embodiments of the disclosure.

FIG. 6 shows another exemplary environment in which a personalized message is generated, in accordance with some embodiments of the disclosure. The exemplary environment of FIG. 6 is broadly similar to those of FIGS. 1, 2, 3, 4A, 5A, 5B and 5C. As with FIG. 1, a user identifies a media item at a smartphone 600. In this example, a photo 602 is selected by the user. In this example, the user selects the contacts "Alice," "Bob" and "Charlie" 604 to send the photo 602 to. Again, an association between the user and recipient is identified 606, and a personalized message is generated 608. The photo 602 and the personalized message 608 are sent 610 to a selected contact from the smartphone 600. In addition, identifying an association between a user and a recipient 606 and/or the personalized message 608 may be based on an identified platform 638. A platform may be a network, such as Facebook, LinkedIn, Instagram, and/or TikTok. In addition, a platform may also comprise the application used to send the message and/or the message format, such as email, MMS, Video Message, WhatsApp, iMessage, FaceTime, Facebook Messenger, Telegram, Signal, Viber, WeChat, Tinder, Bumble and/or Grindr. For example, if a user is sending a message via LinkedIn, it may be inferred that the user has a profession association with the selected contact, and a more formal personalized message may be generated. In another example, if a user is sending a message via Grindr, the user may have a more casual association with the selected contact, and a flirty personalized message may be generated. In a further example, if a user is sending a message via email, then again, a more formal association may be inferred. In this example, the identified platform 638 is LinkedIn and the personalized message 608 is "Dear Alice, I have arrived home from vacation. See you at work on Monday." The relatively formal "I have" rather than "I've" and the "See you at work" parts of the message are based on the identified platform being LinkedIn. In some examples, personalized messages that are to be sent to professional contacts and/or colleagues may be devoid of emojis and or abbreviations, such as "lol." In addition, predetermined rules may be applied to a personalized message to ensure that correct grammar is applied. As before, the personalized message 608 and the selected photo 602 are sent 610 to the selected contact from the smartphone 600. In some examples, not shown, the identifying the association 606, the personalized message generation 608 and the sending 610 of the media item and message may be performed for the additional selected contacts 604, in this example, "Bob" and "Charlie." In addition, the identified platform 638 may be consistent between the selected contacts 604. In other examples, the identified platform 638 may be different between the selected contacts 604, in which case the platform is identified for each selected contact. The method described in connection with FIG. 6 may, for example, be combined with the methods described in connection with FIGS. 2 and/or 3 and/or 4A and/or 5A and/or 5B and/or 5C, such that the personalized message may be based on an identified platform and at least one of a feature identified in a media item and/or an initial message sent to a contact and/or an identified emotion and/or a time and/or a location and/or a calendar invite, such that the personalized message reflects the identified platform and at least one of a general message and/or an identified feature and/or an identified emotion and/or a time and/or a location and/or a calendar invite.

In a variation on the environment discussed in connection with FIG. 6, a user may be able to manually select a mode for the personalized message. For example, a user may be able to select a "Pro" mode (setting) that causes the personalized message to be generated in a similar way as to when, for example, the platform is identified as LinkedIn. For example, a personalized message with a "Pro" mode applied may be devoid of emojis and/or abbreviations, such as "lol". In addition, predetermine rules may be applied to a personalized message to ensure that correct grammar is applied. In other examples, different modes may be applied to the personalized message, such as "Casual," "Friend," "Acquaintance" and/or "Colleague."

Figure 7:
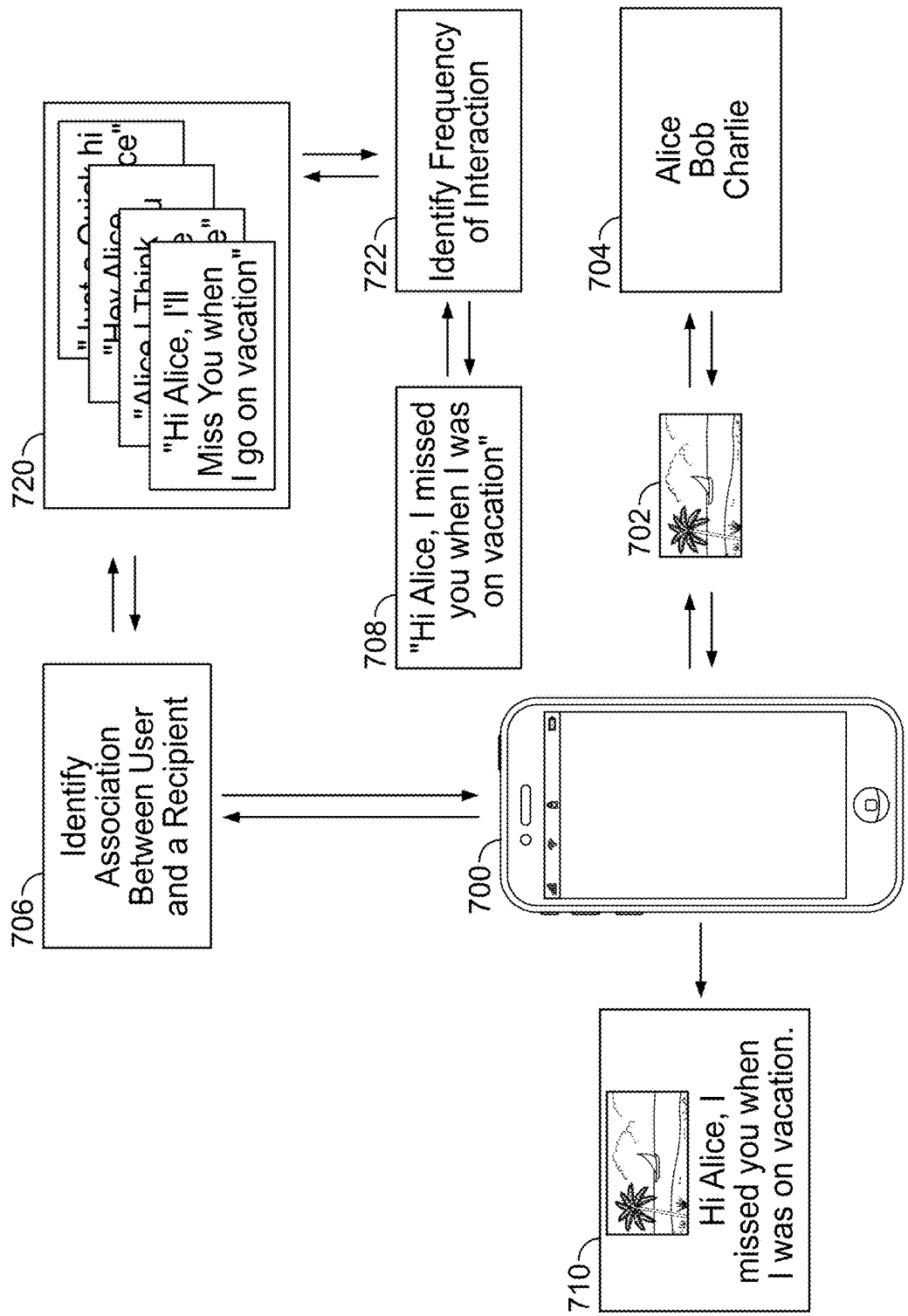
FIG. 7 shows another exemplary environment in which a personalized message is generated, in accordance with some embodiments of the disclosure.

FIG. 7 shows another exemplary environment in which a personalized message is generated, in accordance with some embodiments of the disclosure. The exemplary environment of FIG. 7 is broadly similar to those of FIGS. 1, 2, 3, 4A, 5A, 5B, 5C and 6. As with FIG. 1, a user identifies a media item at a smartphone 700. In this example, a photo 702 is selected by the user. In this example, the user selects the contacts "Alice," "Bob" and "Charlie" 704 to send the photo 702 to. Again, an association between the user and recipient is identified 706, and a personalized message is generated 708. The photo 702 and the personalized message 708 are sent 710 to a selected contact from the smartphone 700. In addition, historic messages between the user and a contact 720 are analyzed to identify a frequency of interaction 722. For example, if a user and a contact message each other frequently, it may be inferred that the relationship between the two is more casual than if a user and a contact message each other infrequently. In addition to the frequency, the type of message and/or media items sent may also be identified. For example, if the message history comprises lots of media items and/or abbreviations, a more casual relationship may be inferred. The association between the user and a recipient 704 and/or the personalized message 708 may be based on the identified frequency of interaction. In this example, the user and the contact message each other relatively frequently, and the personalized message is "Hi Alice, I missed you when I was on vacation." The "I missed you" is based on the relatively frequent messaging between the user and the contact. "I missed you" would likely be inappropriate for a personalized message to a contact that the user messages infrequently. In addition, the identified messaging frequency may be stored at the computing device or with a profile associated with the user, so that the message history does not need to be reanalyzed to identify a messaging frequency each time a personalized message is generated. In some examples, the messaging frequency may be stored for a period of time, before a messaging frequency between a user and a contact is reanalyzed. This period of time may be a fixed period of time, such as a week, or may be a variable period of time based, for example, on the frequency of messaging between the user and the contact. The identified messaging frequency may be stored with a profile associated with the user, such that if a user logs on to a different computing device, then the identified messaging frequency can be accessed at that computing device and used for generating a personalized message. As before, the personalized message 708 and the selected photo 702 are sent 710 to the selected contact from the smartphone 700. In some examples, not shown, the identifying the association 706, the personalized message generation 708 and the sending 710 of the media item and message may be performed for the additional selected contacts 704, in this example, "Bob" and "Charlie." In addition, a message history 720 between a user and a selected contact (i.e., "Bob" and "Charlie" in this example) may analyzed to identify an interaction frequency 722, on which the personalized message 708 is based for those contacts. The method described in connection with FIG. 7 may, for example, be combined with the methods described in connection with FIGS. 2 and/or 3 and/or 4A and/or 5A and/or 5B and/or 5C and/or 6, such that the personalized message may be based on an identified frequency of interaction between a user and a contact and at least one of a feature identified in a media item and/or an initial message sent to a contact and/or an identified emotion and/or a time and/or a location and/or a calendar invite and/or an identified platform, such that the personalized message reflects the identified frequency of interaction between a user and a contact and at least one of a general message and/or an identified feature and/or an identified emotion and/or a time and/or a location and/or a calendar invite and/or a platform.

Figure 8:
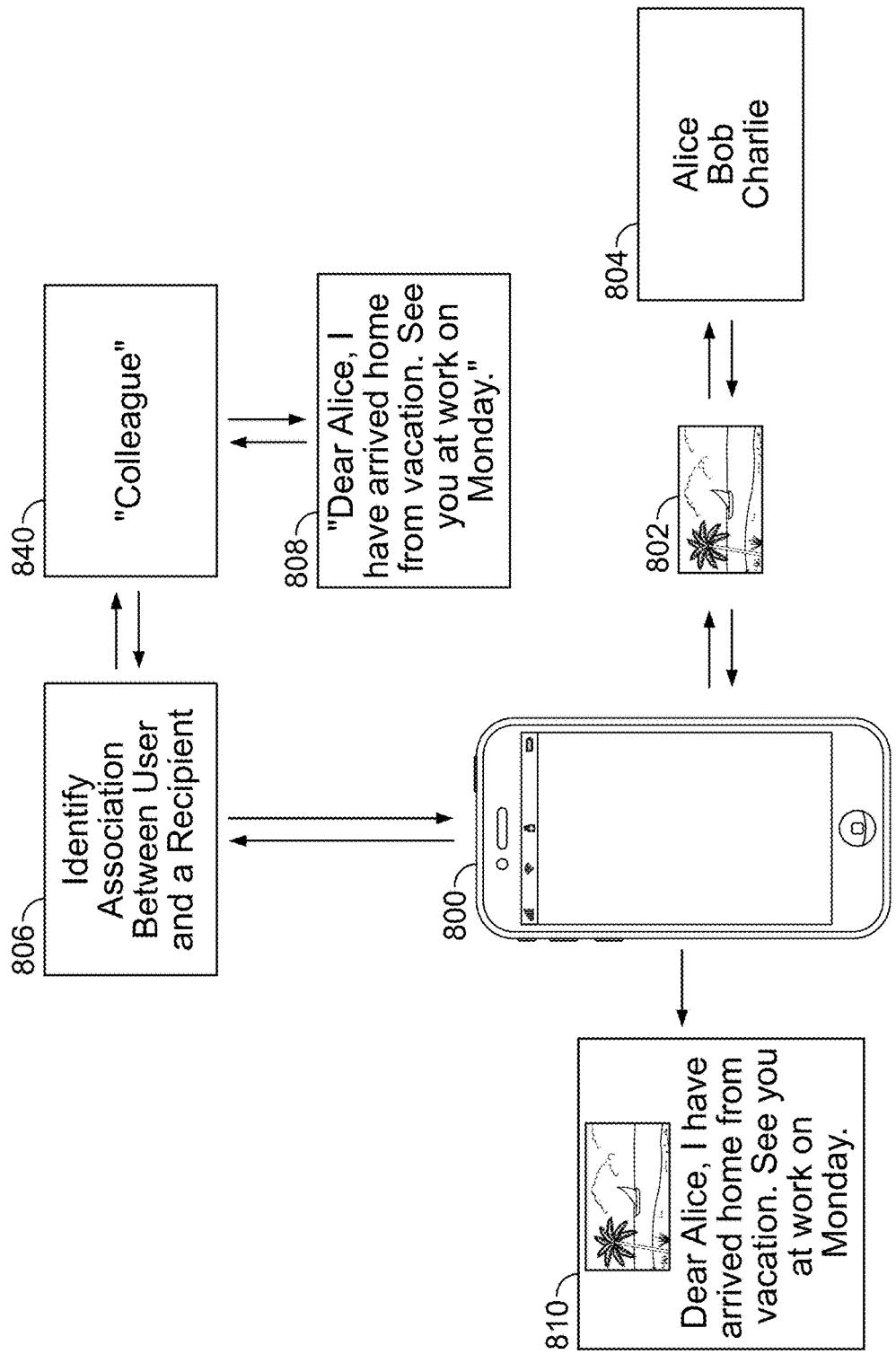
FIG. 8 shows another exemplary environment in which a personalized message is generated, in accordance with some embodiments of the disclosure.

FIG. 8 shows another exemplary environment in which a personalized message is generated, in accordance with some embodiments of the disclosure. The exemplary environment of FIG. 8 is broadly similar to those of FIGS. 1, 2, 3, 4A, 5A, 5B, 5C, 6 and 7. As with FIG. 1, a user identifies a media item at a smartphone 800. In this example, a photo 802 is selected by the user. In this example, the user selects the contacts "Alice," "Bob" and "Charlie" 804 to send the photo 802 to. Again, an association between the user and recipient is identified 806, and a personalized message is generated 808. The photo 802 and the personalized message 808 are sent 810 to a selected contact from the smartphone 800. In addition, the identifying an association between a user and a recipient comprises the user manually setting 840 an association between the user and a recipient. For example, the user may be prompted to input an association in a free-text field, and the text may be processed using natural language processing. In another example, the user may be prompted to select a relationship from a list of relationships. In a further example, a phonebook application may have a field in which a user can manually identify a relationship between themselves and a contact. In this example, the input relationship is "Colleague" and a relatively formal personalized message 808 is generated as before. The manually input association 840 may be stored with a profile associated with the user, such that if a user logs on to a different computing device, then the identified association can be accessed at that computing device and used for generating a personalized message. As before, the personalized message 808 and the selected photo 802 are sent 810 to the selected contact from the smartphone 800. In some examples, not shown, the identifying the association 806, the personalized message generation 808 and the sending 810 of the media item and message may be performed for the additional selected contacts 804, in this example, "Bob" and "Charlie." In addition, a user may manually input an association 840 for one or more of the other selected contacts (i.e., "Bob" and "Charlie" in this example), on which the personalized message 708 is based for those contacts. The method described in connection with FIG. 8 may, for example, be combined with the methods described in connection with FIGS. 2 and/or 3 and/or 4A and/or 5A and/or 5B and/or 5C and/or 6 and/or 7, such that the personalized message may be based on a manually input association and at least one of a feature identified in a media item and/or an initial message sent to a contact and/or an identified emotion and/or a time and/or a location and/or a calendar invite and/or an identified platform and/or an identified frequency of interaction between a user and a contact, such that the personalized message reflects the input association and at least one of a general message and/or an identified feature and/or an identified emotion and/or a time and/or a location and/or a calendar invite and/or a platform and/or an identified frequency of interaction between a user and a contact.

Figure 9:
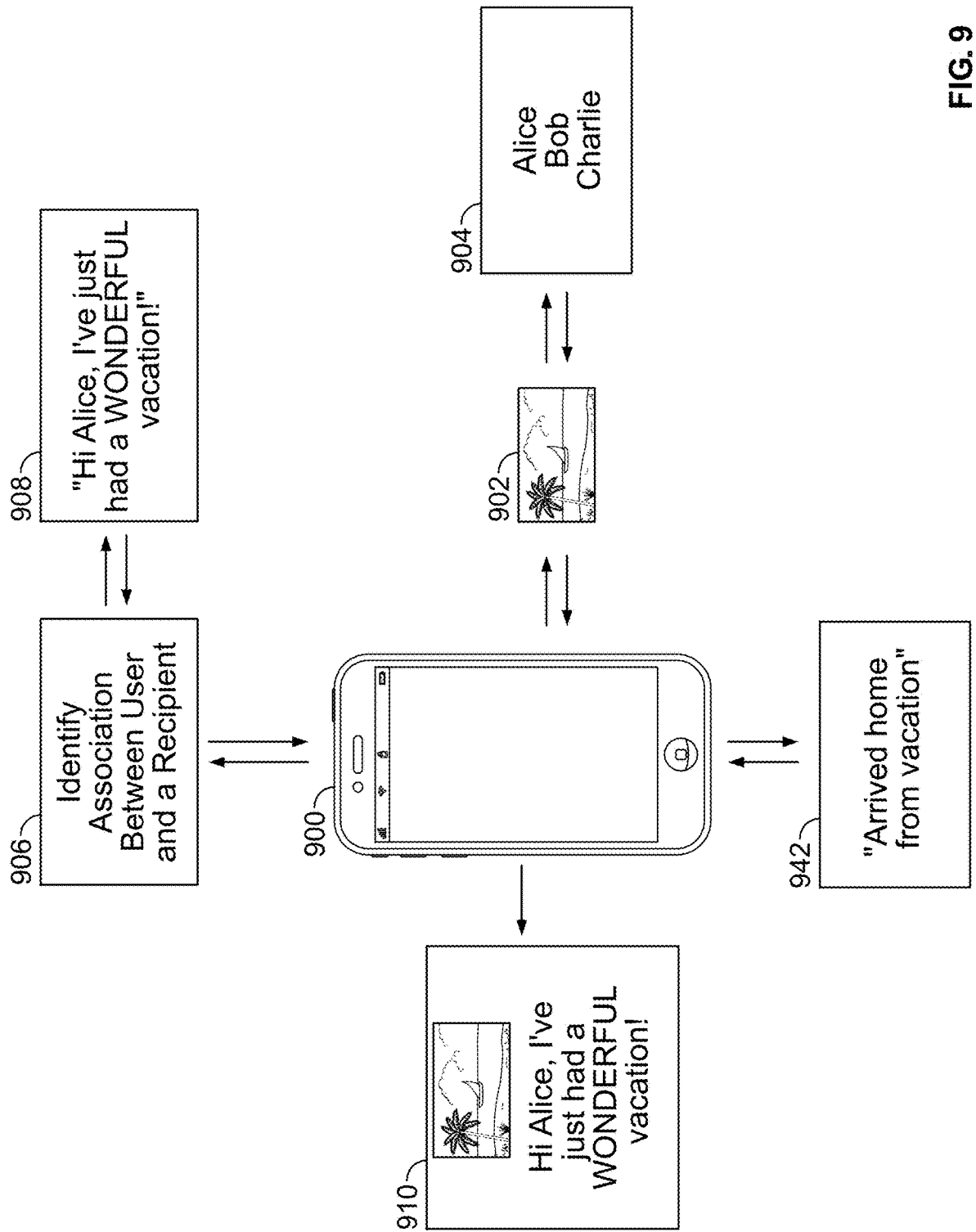
FIG. 9 shows another exemplary environment in which a personalized message is generated, in accordance with some embodiments of the disclosure.

FIG. 9 shows another exemplary environment in which a personalized message is generated, in accordance with some embodiments of the disclosure. The exemplary environment of FIG. 9 is broadly similar to those of FIGS. 1, 2, 3, 4A, 5A, 5B, 5C, 6, 7 and 8. As with FIG. 1, a user identifies a media item at a smartphone 900. In this example, a photo 902 is selected by the user. In this example, the user selects the contacts "Alice," "Bob" and "Charlie" 904 to send the photo 902 to. Again, an association between the user and recipient is identified 906, and a personalized message is generated 908. The photo 902 and the personalized message 908 are sent 910 to a selected contact from the smartphone 900. In addition, a user may provide a seed word and/or phrase 942 from which the personalized message 908 is generated. For example, the user may provide the seed phrase "Arrived home from vacation." In this example, based on the seed phrase 942 and the identified association between a user and a recipient 906, the personalized message is "Hi Alice, I've just had a WONDERFUL vacation!" As can be seen, the personalized message does not need to comprise all of the seed words provided by the user, although in other examples, the personalized message may comprise all of the seed words provided by the user. The user may provide the seed words via a specific interface. In other examples, the user may type the message into an existing messaging application, and the text may be accessed from the messaging application. In some examples, the seed phrase may be an entire message; however, the message may be amended to reflect the nature of the association between the user and the selected contact. For example, if the identified contact is a colleague, one or more rules may be applied to the message to ensure that correct grammar is used, and any emojis and/or abbreviations, such as "lol" are removed. As before, the personalized message 908 and the selected photo 902 are sent 910 to the selected contact from the smartphone 900. In some examples, not shown, the identifying the association 906, the personalized message generation 908 and the sending 910 of the media item and message may be performed for the additional selected contacts 904, in this example, "Bob" and "Charlie." In addition, the same seed words and/or phrase 942 may be used to generate messages for the additional selected contacts 940. In other examples, the user may provide different seed words and/or phrases for each selected contact or a sub-group of selected contacts. The method described in connection with FIG. 9 may, for example, be combined with the methods described in connection with FIGS. 2 and/or 3 and/or 4A and/or 5A and/or 5B and/or 5C and/or 6 and/or 7 and/or 8, such that the personalized message may be based on a seed word and/or phrase and at least one of a feature identified in a media item and/or an initial message sent to a contact and/or an identified emotion and/or a time and/or a location and/or a calendar invite and/or an identified platform and/or an identified frequency of interaction between a user and a contact and/or a manually input association, such that the personalized message reflects the seed word and/or phrase and at least one of a general message and/or an identified feature and/or an identified emotion and/or a time and/or a location and/or a calendar invite and/or a platform and/or an identified frequency of interaction between a user and a contact and/or a manually input association.

Figure 10A:
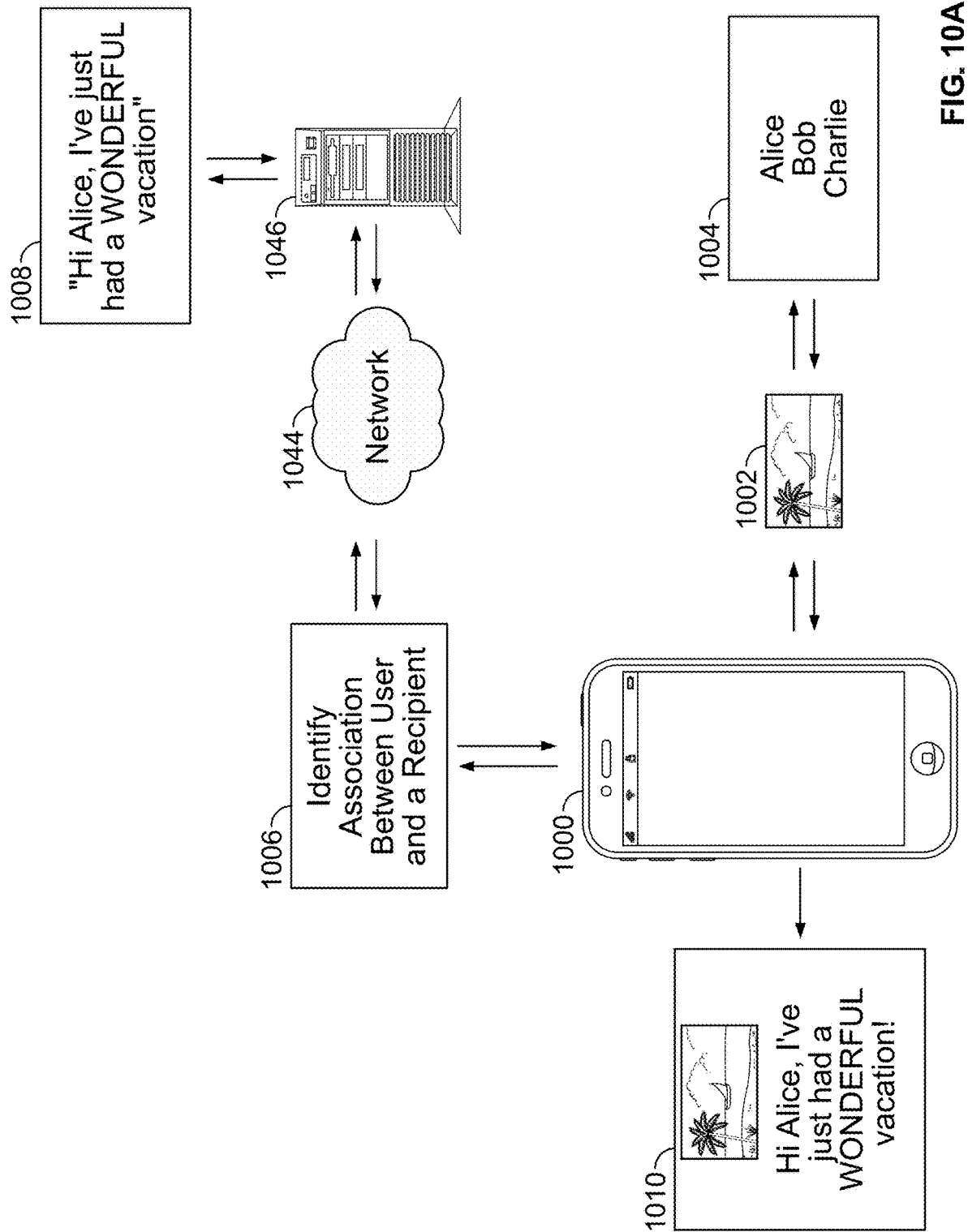
FIG. 10A shows another exemplary environment in which a personalized message is generated, in accordance with some embodiments of the disclosure.

FIG. 10A shows another exemplary environment in which a personalized message is generated, in accordance with some embodiments of the disclosure. As with FIG. 1, a user identifies a media item at a smartphone 1000. In this example, a photo 1002 is selected by the user. In this example, the user selects the contacts "Alice," "Bob" and "Charlie" 1004 to send the photo 1002 to. Again, an association between the user and recipient is identified 1006 and a personalized message is generated 1008. The photo 1002 and the personalized message 1008 are sent 1010 to a selected contact from the smartphone 1000. In addition, the identified association between a user and a recipient 1006 is transmitted via a network 1044, such as a cellular network and the internet, to a server 1046. The network 1044 may include the internet and/or a local network and may include wired and/or wireless components. The personalized message 1008 is generated at the server 1046 and is sent back to the smartphone 1000 via the network 1044. As before, the personalized message 1008 and the selected photo 1002 are sent 1010 to the selected contact from the smartphone 1000. In some examples, not shown, the identifying the association 1006, the personalized message generation 1008 and the sending 1010 of the media item and message may be performed for the additional selected contacts 1004, in this example, "Bob" and "Charlie." The generation of the personalized message at a server may be performed in combination with any of the aforementioned examples, including the exemplary environments as shown in FIGS. 2, 3, 4A, 5A, 5B, 5C, 6, 7, 8 and/or 9.

Figure 10B:
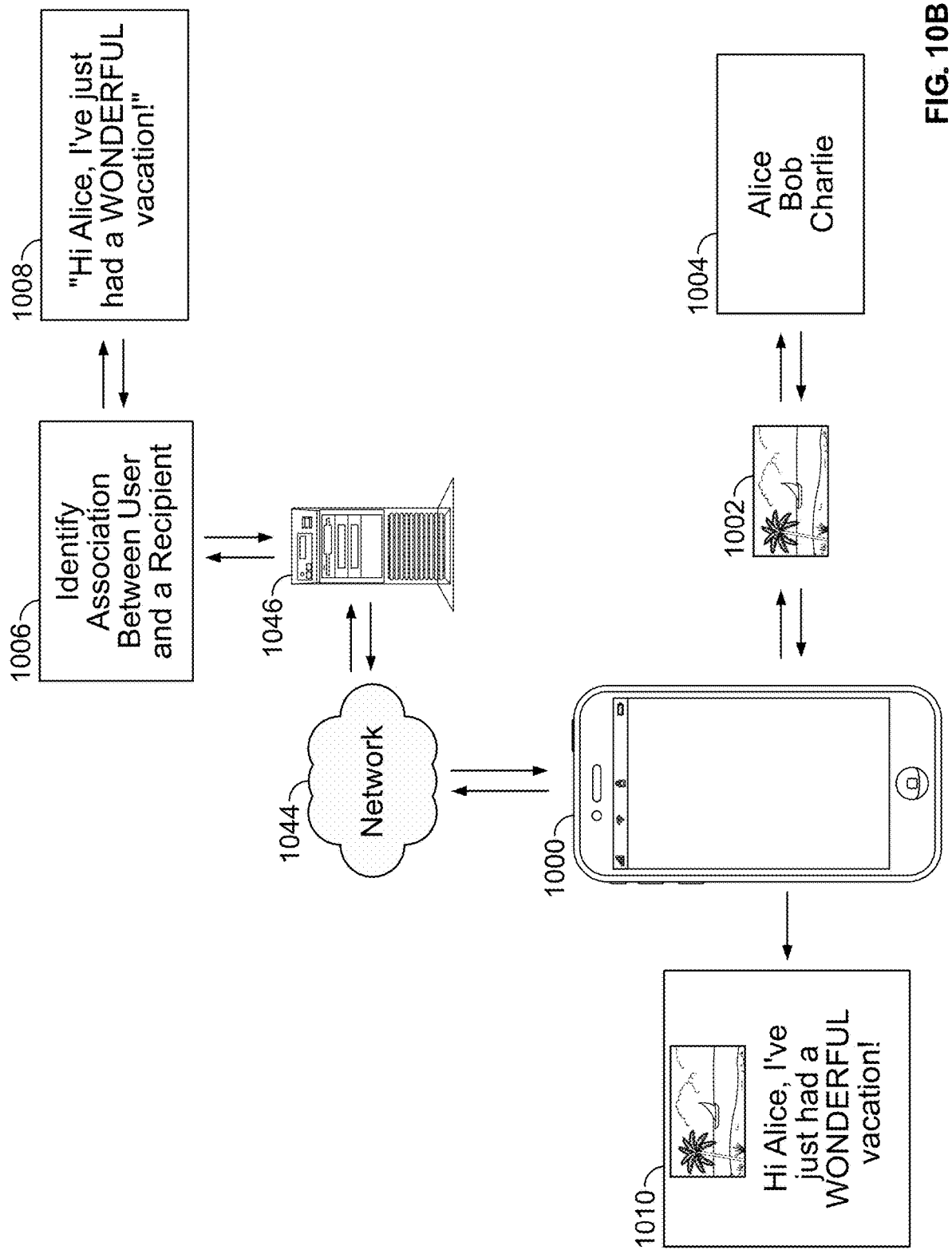
FIG. 10B shows another exemplary environment in which a personalized message is generated, in accordance with some embodiments of the disclosure.

FIG. 10B shows another exemplary environment in which a personalized message is generated, in accordance with some embodiments of the disclosure. FIG. 10B is a variation on the exemplary environment shown in FIG. 10A, wherein the identification of an association between a user and a recipient 1006 and the generation of a personalized message 1008 are performed at a server 1046. Again, the generated message is sent via a network 1044 to the smartphone 1000. As before, the personalized message 1008 and the selected photo 1002 are sent 1010 to the selected contact from the smartphone 1000. In some examples, not shown, the identifying the association 1006, the personalized message generation 1008 and the sending 1010 of the media item and message may be performed for the additional selected contacts 1004, in this example, "Bob" and "Charlie." The identification of an association between a user and a recipient and the generation of the personalized message at a server may be performed in combination with any of the aforementioned examples, including the exemplary environments as shown in FIGS. 2, 3, 4A, 5A, 5B, 5C, 6, 7, 8 and/or 9.

Figure 10C:
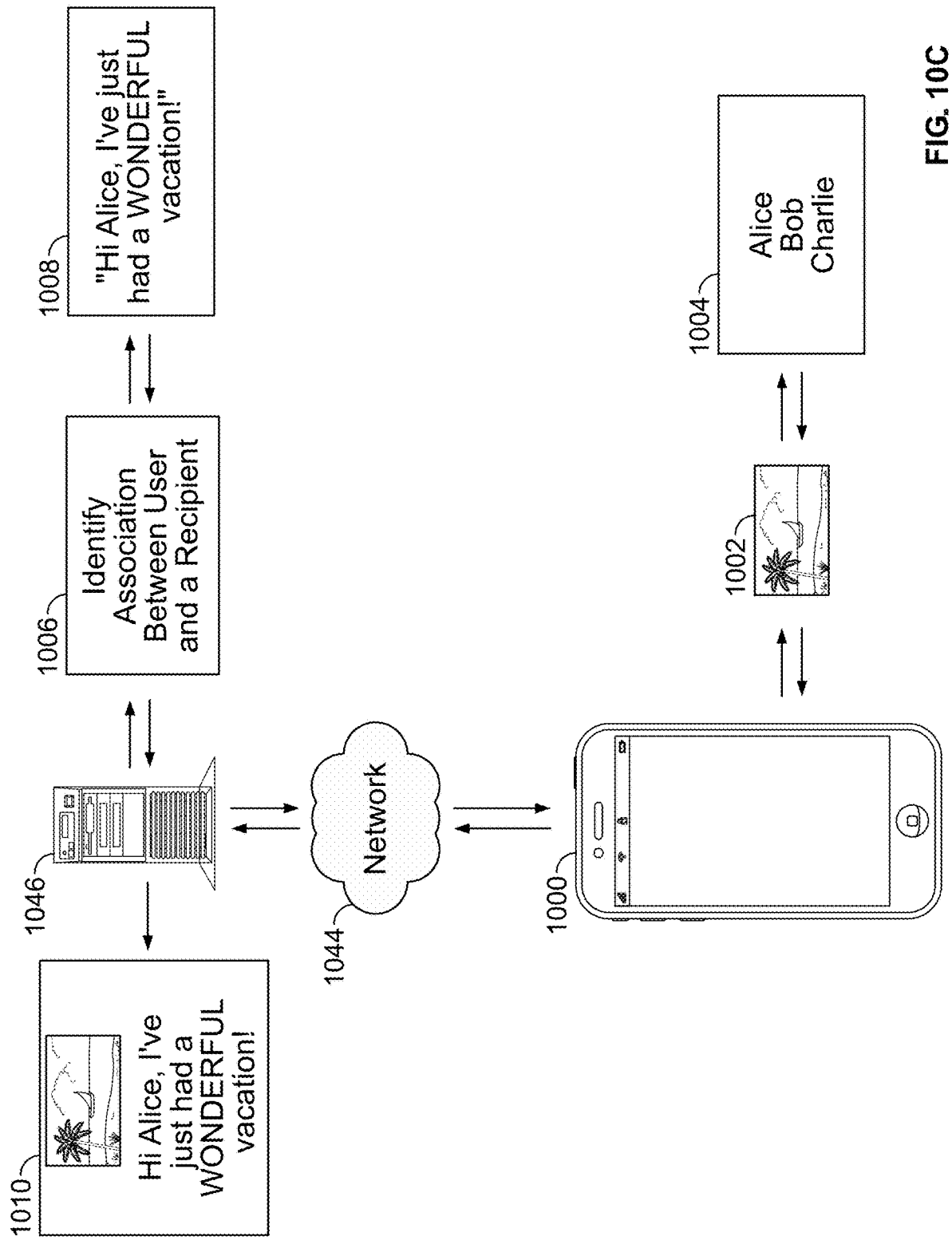
FIG. 10C shows another exemplary environment in which a personalized message is generated, in accordance with some embodiments of the disclosure.

FIG. 10C shows another exemplary environment in which a personalized message is generated, in accordance with some embodiments of the disclosure. FIG. 10C is a variation on the exemplary environment shown in FIGS. 10A and 10B, wherein the identification of an association between a user and a recipient 1006 and the generation of a personalized message 1008 are performed at a server 1046. In addition, the selected photo 1002 is sent from the smartphone 1000, via the network 1044, to the server 1046. The generated message and the photo are sent 1010 from the server 1046 to the selected contact. In some examples, not shown, the identifying the association 1006, the personalized message generation 1008 and the sending 1010 of the media item and message may be performed for the additional selected contacts 1004, in this example, "Bob" and "Charlie." The identification of an association between a user and a recipient, the generation of the personalized message at a server and the sending of the generated message and media item from the server to a recipient may be performed in combination with any of the aforementioned examples, including the exemplary environments as shown in FIGS. 2, 3, 4A, 5A, 5B, 5C, 6, 7, 8 and/or 9.

In some variations, instead of performing the identification of an association between a user and a contact and/or the generation of a personalized message at a server, these steps may be performed via a specialized artificial intelligence processor at the computing device. Examples of such a processor include Apple's M1 chip, Apple's A14 Bionic chip, Google's TPU processor and Intel's Gaudi and Goya AI processors.

Figure 11A:
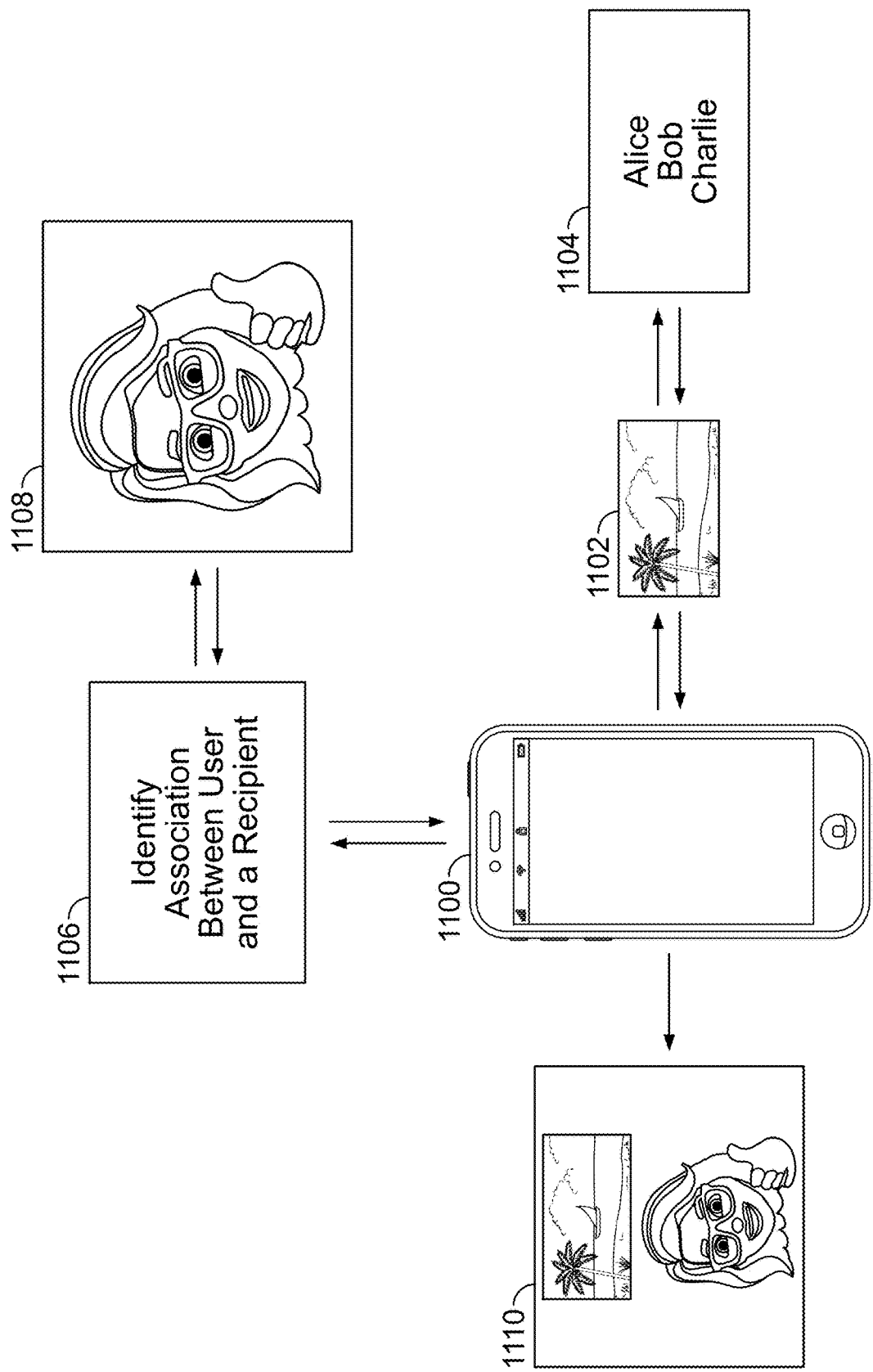
FIG. 11A shows another exemplary environment in which a personalized message is generated, in accordance with some embodiments of the disclosure.

FIG. 11A shows another exemplary environment in which a personalized message is generated, in accordance with some embodiments of the disclosure. As with FIG. 1, a user identifies a media item at a smartphone 1100. In this example, a photo 1102 is selected by the user. In this example, the user selects the contacts "Alice," "Bob" and "Charlie" 1104 to send the photo 1102 to. Again, an association between the user and recipient is identified 1106 and a personalized message is generated 1108. The photo 1102 and the personalized message 1108 are sent 1110 to a selected contact from the smartphone 1100. FIG. 11A depicts a variant wherein the personalized message 1108 is not a text-based message, but is an animated emoji, such as a memoji. In other examples, the message may be a GIF or any other form of animation. As before, the message may be personalized based on an association between a user and a recipient and any of the other aforementioned features, such as a seed word and/or phrase and at least one of a feature identified in a media item and/or an initial message sent to a contact and/or an identified emotion and/or a time and/or a location and/or a calendar invite and/or an identified platform and/or an identified frequency of interaction between a user and a contact and/or a manually input association. As before, the personalized message 1108 and the selected photo 1102 are sent 1110 to the selected contact from the smartphone 1100 (i.e., two media items are sent to the contact, the selected photo 1102 and the animated message 1108). In some examples, not shown, the identifying the association 1106, the personalized message generation 1108 and the sending 1110 of the media item and message may be performed for the additional selected contacts 1104, in this example, "Bob" and "Charlie." The identification of an association between a user and a recipient and the generation of the personalized message at a server may be performed in combination with any of the aforementioned examples, including the exemplary environments as shown in FIGS. 2, 3, 4A, 5A, 5B, 5C, 6, 7, 8 and/or 9.

Figure 11B:
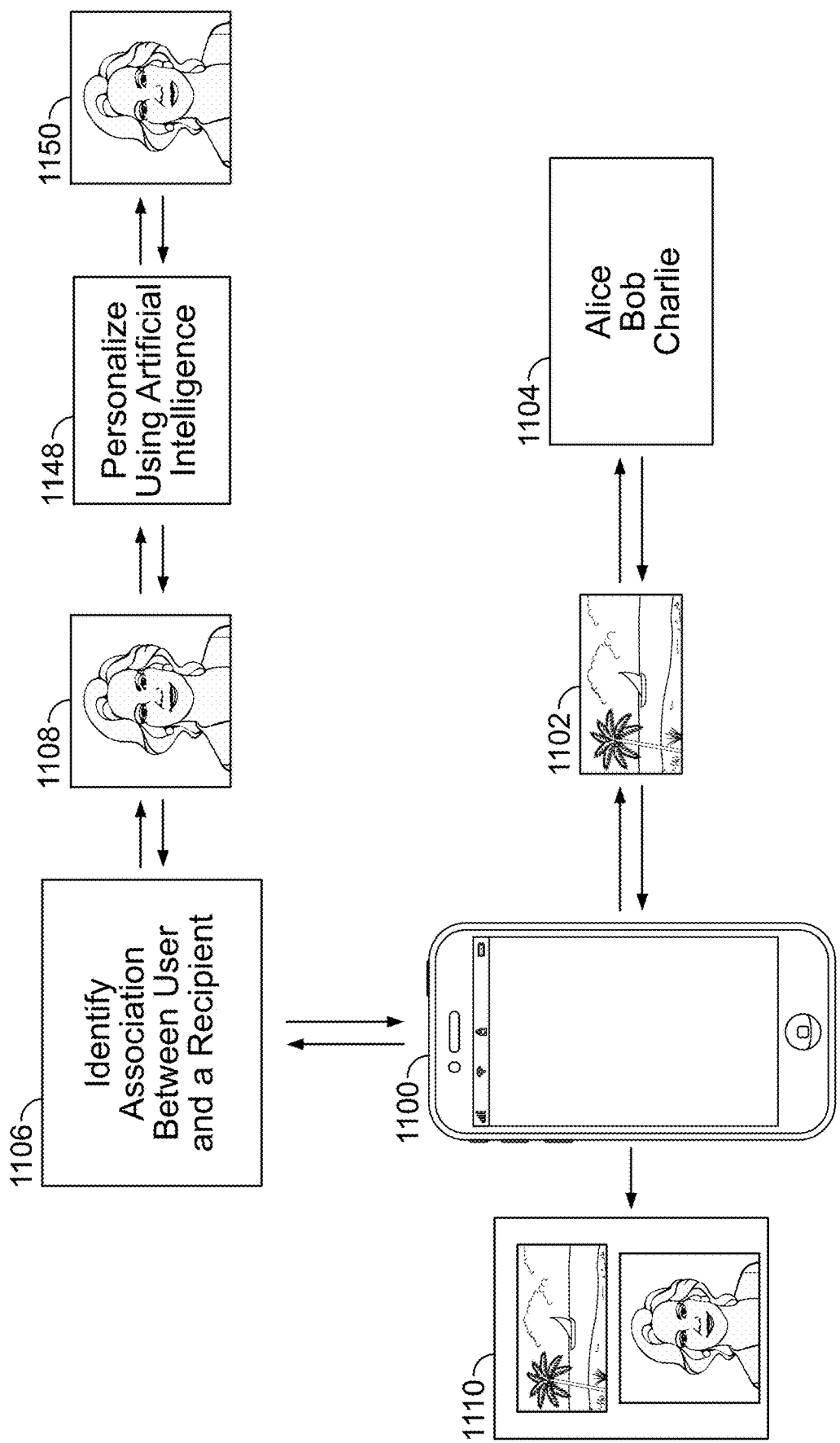
FIG. 11B shows another exemplary environment in which a personalized message is generated, in accordance with some embodiments of the disclosure.

FIG. 11B shows another exemplary environment in which a personalized message is generated, in accordance with some embodiments of the disclosure. As with FIG. 1, a user identifies a media item at a smartphone 1100. In this example, a photo 1102 is selected by the user. In this example, the user selects the contacts "Alice," "Bob" and "Charlie" 1104 to send the photo 1102 to. Again, an association between the user and recipient is identified 1106 and a personalized message is generated 1108. The photo 1102 and the personalized message 1108 are sent 1110 to a selected contact from the smartphone 1100. FIG. 11B depicts a variant wherein the personalized message 1108 is not a text-based message but is a personalized video clip of the user. The user provides training material 1150 for an artificial intelligence system 1148 to generate a personalized video 1108. The artificial intelligence system 1148 may, for example, use deep learning and/or a trained neural network in order to generate a personalized video message 1108. For example, a neural network could extract and encode the locations of key facial features of a user. The encoded data may be passed on to a generative adversarial network, along with a reference video frame. The generative adversarial network may be trained to generate a video message by projecting facial features onto the reference video frame. In another example, the user could provide a wide range of video clips of the user showing different emotions, saying different words and from different camera angles. A text-based personalized message may be generated as an interim step. The artificial intelligence system 1148 may take the generated text-based personalized message and generate a personalized video of the user speaking the message and, optionally, displaying appropriate emotions. In other examples, the user may provide a video of themselves speaking a core message, such as "I've arrived home" and the artificial intelligence system 1148 may personalize the video message with additional segments, such that the video message is personalized for each contact that it is sent to. The personalization may be performed in a similar manner to the personalization discussed above. An example of such an artificial intelligence system is NVIDIA's Maxine AI Platform, which provides a software development kit (SDK) for implementing real-time conversational models. In some examples, a pre-trained model may be utilized such that the user has to provide minimal input. As before, the message may be personalized based on an association between a user and a recipient and any of the other aforementioned features, such as a seed word and/or phrase and at least one of a feature identified in a media item and/or an initial message sent to a contact and/or an identified emotion and/or a time and/or a location and/or a calendar invite and/or an identified platform and/or an identified frequency of interaction between a user and a contact and/or a manually input association. As before, the personalized message 1108 and the selected photo 1102 are sent 1110 to the selected contact from the smartphone 1100 (i.e., two media items are sent to the contact, the selected photo 1102 and the animated message 1108). In some examples, not shown, the identifying the association 1106, the personalized message generation 1108 and the sending 1110 of the media item and message may be performed for the additional selected contacts 1104, in this example, "Bob" and "Charlie." The identification of an association between a user and a recipient and the generation of the personalized message at a server may be performed in combination with any of the aforementioned examples, including the exemplary environments as shown in FIGS. 2, 3, 4A, 5A, 5B, 5C, 6, 7, 8 and/or 9.

Figure 12:
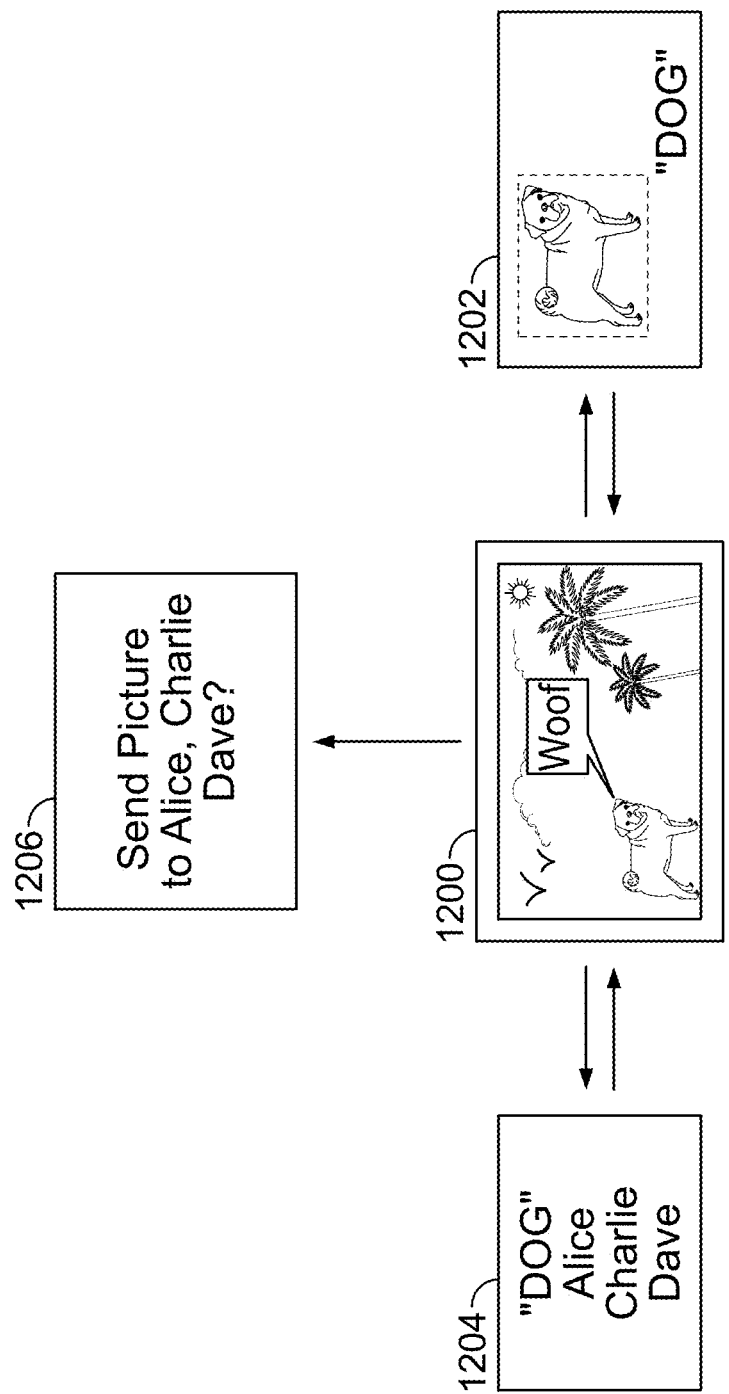
FIG. 12 shows an exemplary environment in which a personalized media item recommendation is generated, in accordance with some embodiments of the disclosure.

FIG. 12 shows an exemplary environment in which a personalized media item recommendation is generated, in accordance with some embodiments of the disclosure. A user identifies a media item at a computing device such as, for example, tablet 1200. The user may identify a media item via, for example, a "Photos" application on their tablet 1200. The user may open the "Photos" application and be presented with a plurality of photos. The user may select a photo 1202 which they wish to send to a one or more contacts. On selecting, for example, a "share" icon, a feature is identified in the photo 1202. In other examples, multiple features may be identified in the media item, such as the photo 1202. A computer vision algorithm may be utilized in order to identify one or more features in the photo. An example of such a computer vision algorithm is Apple's Vision Framework. The computer vision algorithm enables tasks such as face detection, the detection of landmarks in context, object detection and body pose detection to be carried out. The algorithm may be trained on existing, labelled datasets and/or on a user's media items. Other computer vision algorithms for enabling image detection include Google Cloud Vision, Microsoft Computer Vision, OpenCV, Amazon Rekognition, IBM Watson Visual Recognition, Clarifai, Azure Face, Azure Custom Vision and/or SimpleCV. Any one, or combination, of these computer vision algorithms may be used to detect features in a media item. In this example, a "dog" is identified in the photo 1202. A database of photos, identified features and contacts 1204 may be maintained on the tablet 1200 and the database may be queried to identify which contacts the user has previously sent photos comprising various features to in, for example, the last six months. In this example, it is identified that the user has sent photos comprising a "Dog" to "Alice," "Charlie" and "Dave." A recommendation 1206 is generated for display at the tablet 1200. In this example, the recommendation is "Send picture to Alice, Charlie and Dave?" because the user has previously sent dog photos to those contacts. In other examples, similar features may be used to generate contact recommendations. For example, if a user has sent pictures of snowdrops and bluebells to a subset of users, when a flower is identified in a picture, those users may be suggested because snowdrops and bluebells belong to the wider family of flowers. In examples where the media item is a video, the frames of the video may be analyzed to identify any features that are common to at least a sub-set of the frames of the video. In examples where the media item is audio, voice recognition may be utilized to identify a feature that is being talked about. In addition, an identified feature may be used to filter media items comprising the identified feature and/or similar features from within a message thread of the messaging application. For example, the user may have already sent Alice a picture of his dog. The user can then choose to see related pictures included in the same message thread, based on the identified feature (i.e., retrieve a list of all the dog pictures in the thread). Additionally, references to related pictures can automatically be created and displayed to a user. For example, low resolution representations of related pictures can be displayed under the most recent picture that was received to inform the user that related pictures exist. This can be done since the metadata with respect to media on the user's device exists and/or is created as more media items are stored.

Figure 13:
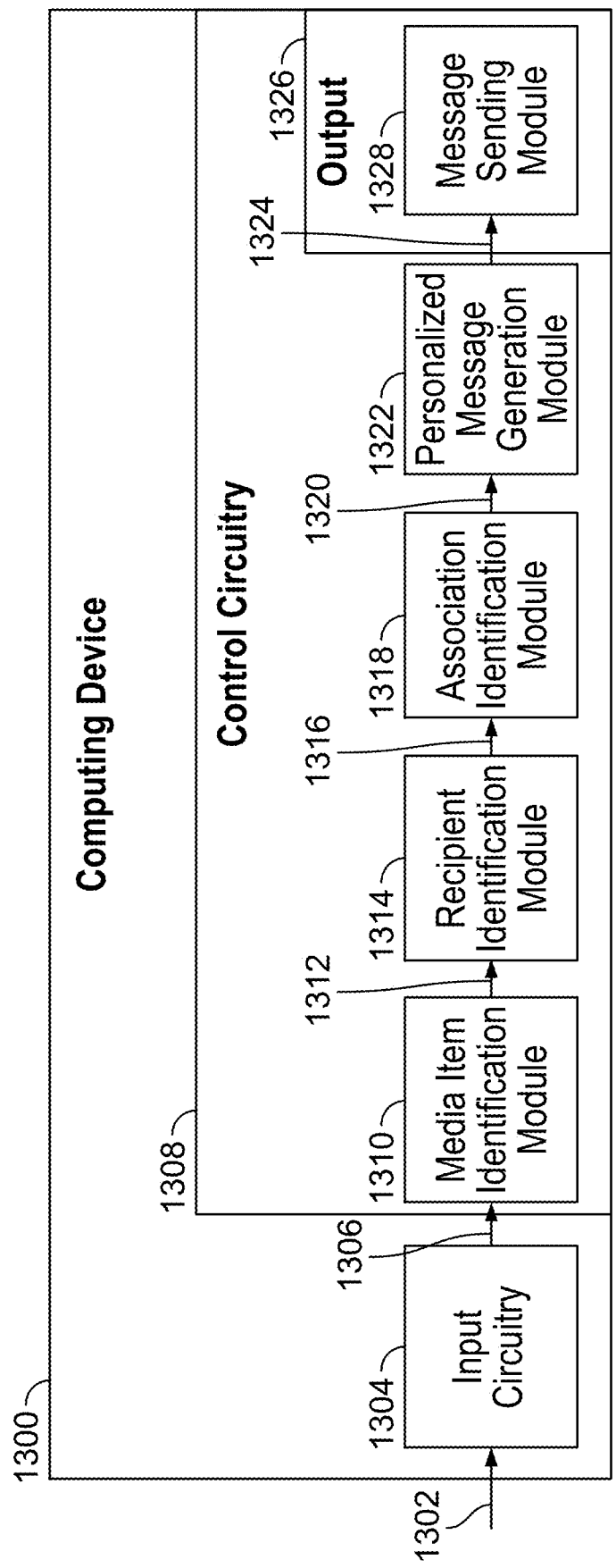
FIG. 13 shows a block diagram representing components of a computing device and data flow therebetween for generating a personalized message, in accordance with some embodiments of the disclosure.

FIG. 13 shows a block diagram representing components of a computing device and data flow therebetween for generating a personalized message, in accordance with some embodiments of the disclosure. Computing device 1300 (e.g., a smartphone 100, 200, 300, 400, 500, 600, 700, 800, 900, 1000, 1100 as discussed in connection with FIGS. 1-111B) comprises input circuitry 1304, control circuitry 1308 and an output module 1326. Control circuitry 1308 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

A user provides an input 1302 that is received by the input circuitry 1304. The input circuitry 1304 is configured to receive a user input related to a computing device. For example, this may be via a touchscreen, keyboard, mouse, microphone and/or infra-red controller of the computing device 1300. The input circuitry 1304 transmits 1306 the user input to the control circuitry 1308.

The control circuitry 1308 comprises a media item identification module 1310, a recipient identification module 1314, an association identification module 1318, a personalized message generation module 1322 and an output module 1326. The user input is transmitted 1306 to the media item identification module 1310. At the media item identification module 1310, a media item is identified, for example, when the user input comprises selecting a media item comprising a photo. The identification of a media item is transferred 1312 to the recipient identification module 1314, where a recipient, or recipients, for the media item and a personalized message are identified. The identification of a media item and the identification of a recipient, or recipients, are transferred 1316 to the association identification module 1318, wherein an association between an identified recipient and the user of the computing device 1300 is identified. The identification of a media item, the identified recipient and the association between the identified recipient and the user are transferred 1320 to the personalized message generation module 1322. At the personalized message generation module 1322, a personalized message is generated. The identified of a media item, the identified recipient and the personalized message are transferred to the output module 1326. At the output module 1326, the message sending module 1328 sends the personalized message and the identified media item from the computing device 1300 to the identified recipient.

Figure 14:
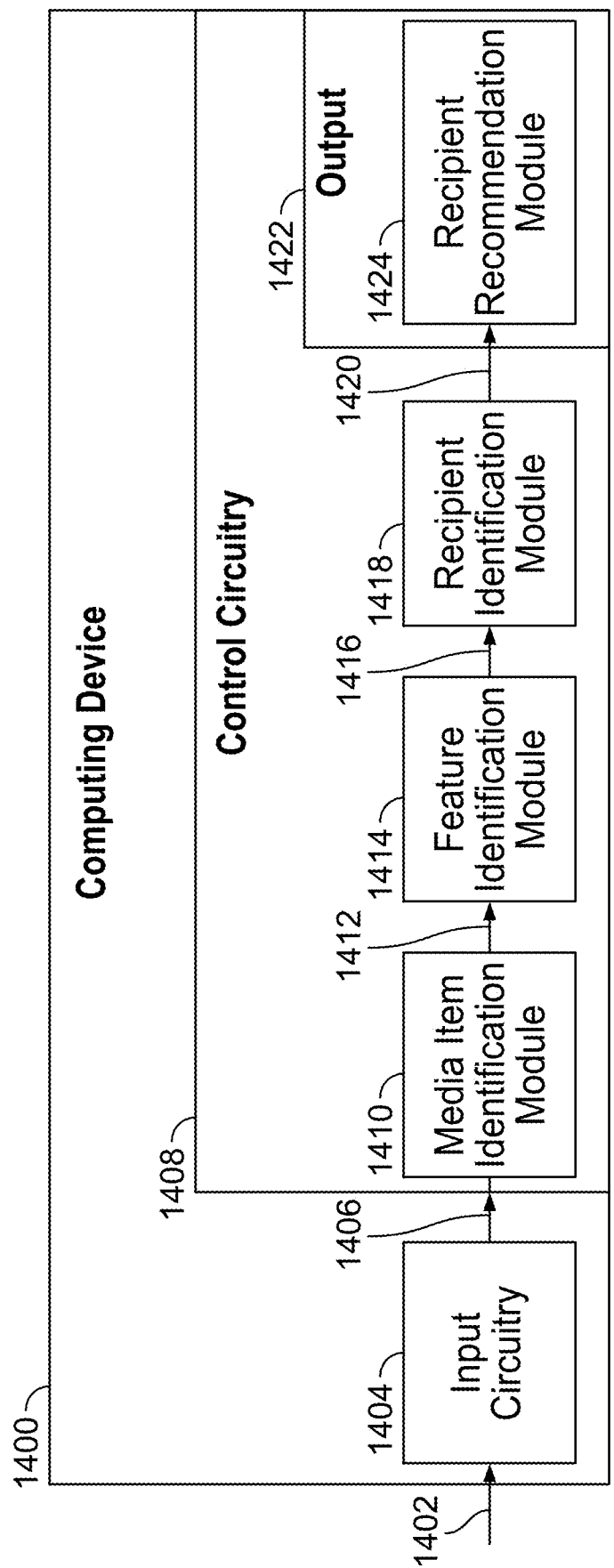
FIG. 14 shows a block diagram representing components of a computing device and data flow therebetween for generating a personalized recipient recommendation, in accordance with some embodiments of the disclosure.

FIG. 14 shows a block diagram representing components of a computing device and data flow therebetween for generating a personalized recipient recommendation, in accordance with some embodiments of the disclosure. Computing device 1400 (e.g., tablet 1200 as discussed in connection with FIG. 12) comprises input circuitry 1404, control circuitry 1408 and an output module 1422. Control circuitry 1408 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

A user provides an input 1402 that is received by the input circuitry 1404. The input circuitry 1404 is configured to receive a user input related to a computing device. For example, this may be via a touchscreen, keyboard, mouse, microphone and/or infra-red controller of the computing device 1400. The input circuitry 1404 transmits 1406 the user input to the control circuitry 1408.

The control circuitry 1408 comprises a media item identification module 1410, a feature identification module 1414, a recipient identification module 1418, and an output module 1422. The user input is transmitted 1406 to the media item identification module 1410. At the media item identification module 1410, a media item is identified, for example, when the user input comprises selecting a media item comprising a photo. The identification of a media item is transferred 1412 to the feature identification module 1414, where a feature (or features) in the media item is identified. The identification of a media item and the identification of a feature are transferred 1416 to the recipient identification module 1418, where a recipient, or recipients, for the media item are identified. The recipients are identified based on the feature that was identified in the media item and on recipients to whom photos comprising the same feature (or features) were sent in the past. The identification of a media item and the identified recipient are transferred 1420 to the output module 1422. At the output module 1422, the recipient recommendation module 1424 generates a recommendation of one or more recipients to send the media item to.

Figure 15:
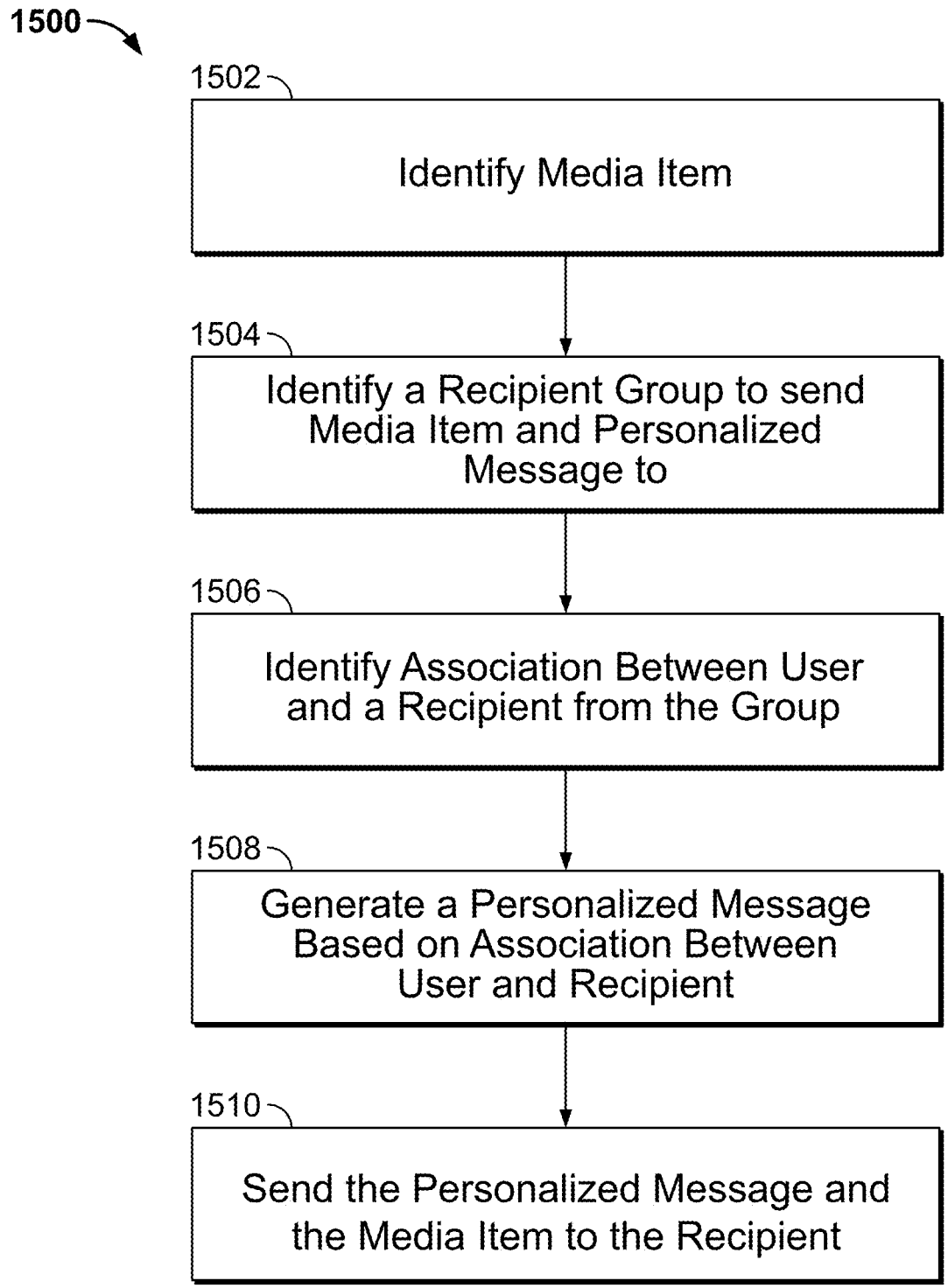
FIG. 15 is a flowchart of illustrative steps involved in generating a personalized message, in accordance with some embodiments of the disclosure.

FIG. 15 is a flowchart of illustrative steps involved in generating a personalized message, in accordance with some embodiments of the disclosure. Process 1500 may be implemented on an aforementioned computing device 100, 200, 300, 400, 500, 600, 700, 800, 900, 1000, 1100. In addition, one or more actions of the process 1500 may be incorporated into or combined with one or more actions of any other process or embodiments described herein.

At 1502, a media item is identified. At 1504, a recipient group (of one or more recipients) to send the media item and a personalized message to is identified. At 1506, an association between a user and a recipient from the group is identified. At 1508, a personalized message is generated, wherein the personalization is based on an association between a user and a recipient. At 1510, the personalized message and the media item are sent to the recipient.

Figure 16:
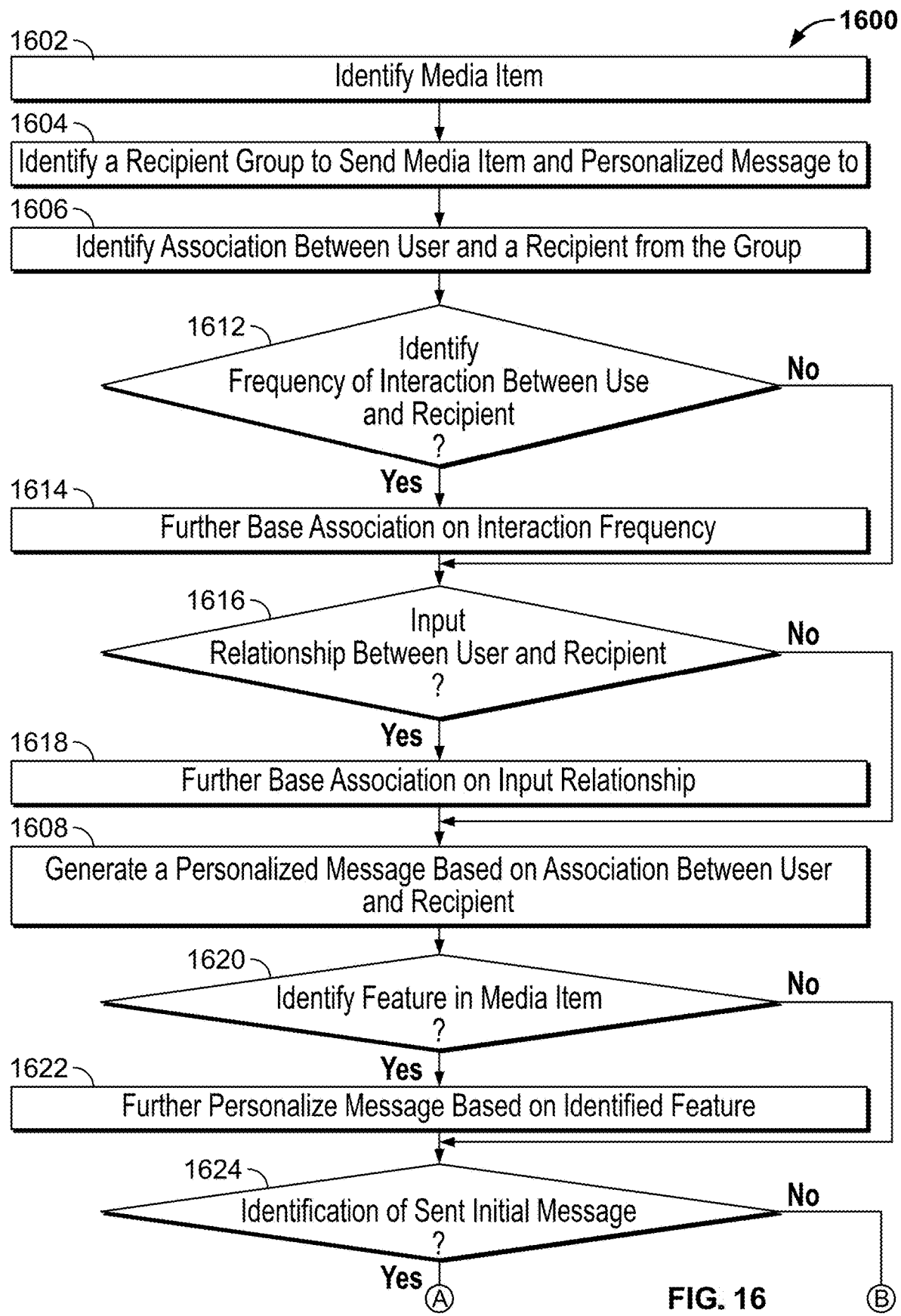
FIG. 16 is another flowchart of illustrative steps involved in generating a personalized message, in accordance with some embodiments of the disclosure.
Figure 16:
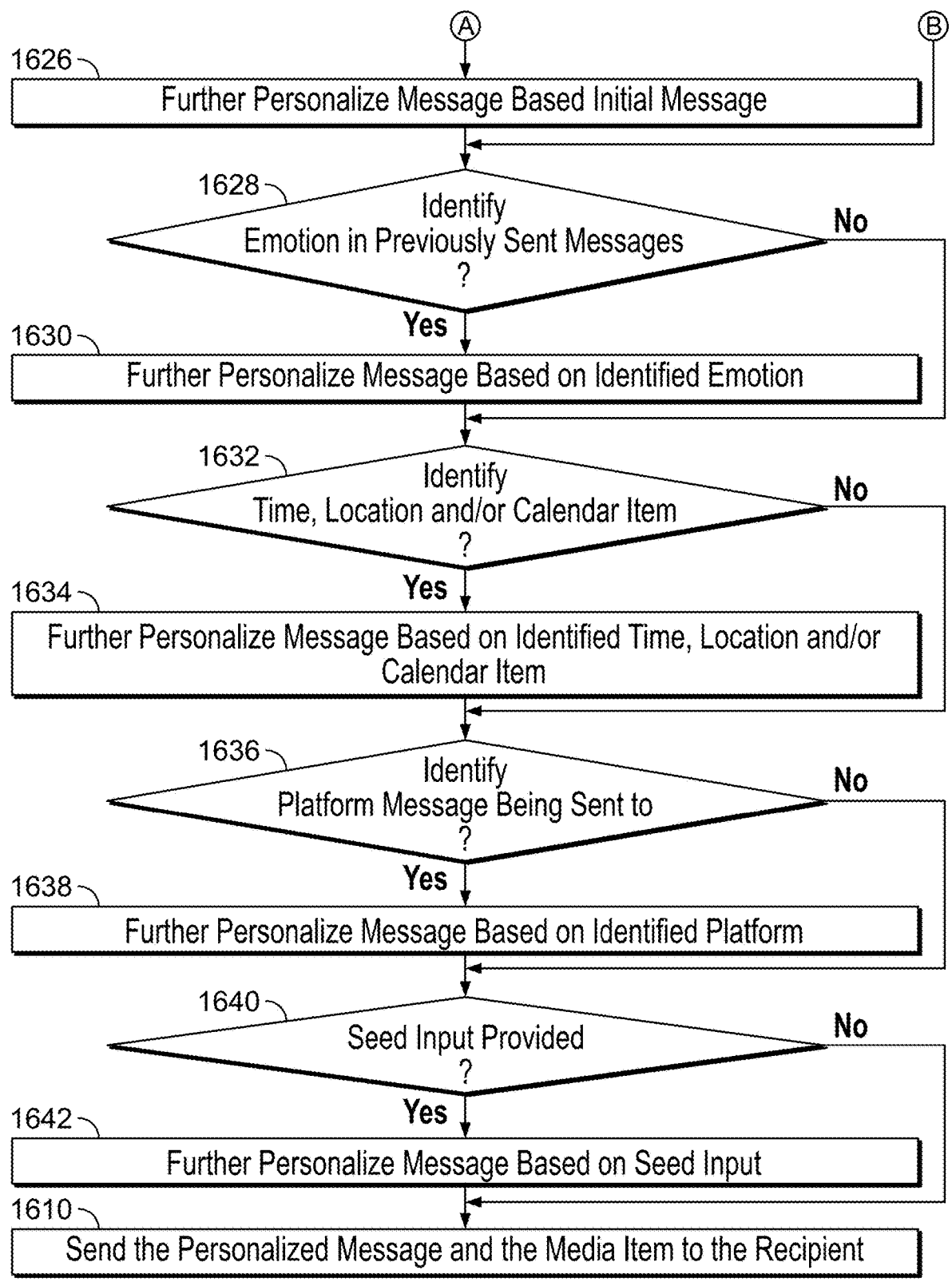

FIG. 16 is a flowchart of illustrative steps involved in generating a personalized message, in accordance with some embodiments of the disclosure. Process 1600 may be implemented on an aforementioned computing device 100, 200, 300, 400, 500, 600, 700, 800, 900, 1000, 1100. In addition, one or more actions of the process 1600 may be incorporated into or combined with one or more actions of any other process or embodiments described herein.

At 1602, a media item is identified. At 1604, a recipient group (of one or more recipients) to send a media item and a personalized message to is identified. At 1606, an association between a user and a recipient from the group is identified. At 1612, a frequency of interaction between a user and a recipient is optionally identified. If the frequency is identified, the association is further based on the interaction frequency 1614. At 1616, a relationship between a user and a recipient is optionally input. If the relationship is input, the association is further based on the input relationship 1618. At 1608, a personalized message is generated, wherein the personalization is based on an association between a user and a recipient. At 1620, a feature in the media item is optionally identified. If a feature is identified, the personalization is further based on the identification 1622. At 1624, a sent initial message is optionally identified. If an initial message is identified, the personalization is further based on the initial message 1626. At 1628, an emotion in previously sent messages is optionally identified. If an emotion is identified, the personalization is further based on the identified emotion 1630. At 1632, a time, location and/or calendar item is optionally identified. If a time, location and/or calendar item is identified, the personalization is further based on the time, location and/or calendar item 1634. At 1636, a platform that the message is being sent to is optionally identified. If a platform is identified, the personalization is further based on the identified platform 1638. At 1640, a seed input, such as a word and/or phrase is optionally input. If a seed input is provided, the personalization is further based on the seed input 1642. At 1610, the personalized message and the media item are sent to the recipient.

Figure 17:
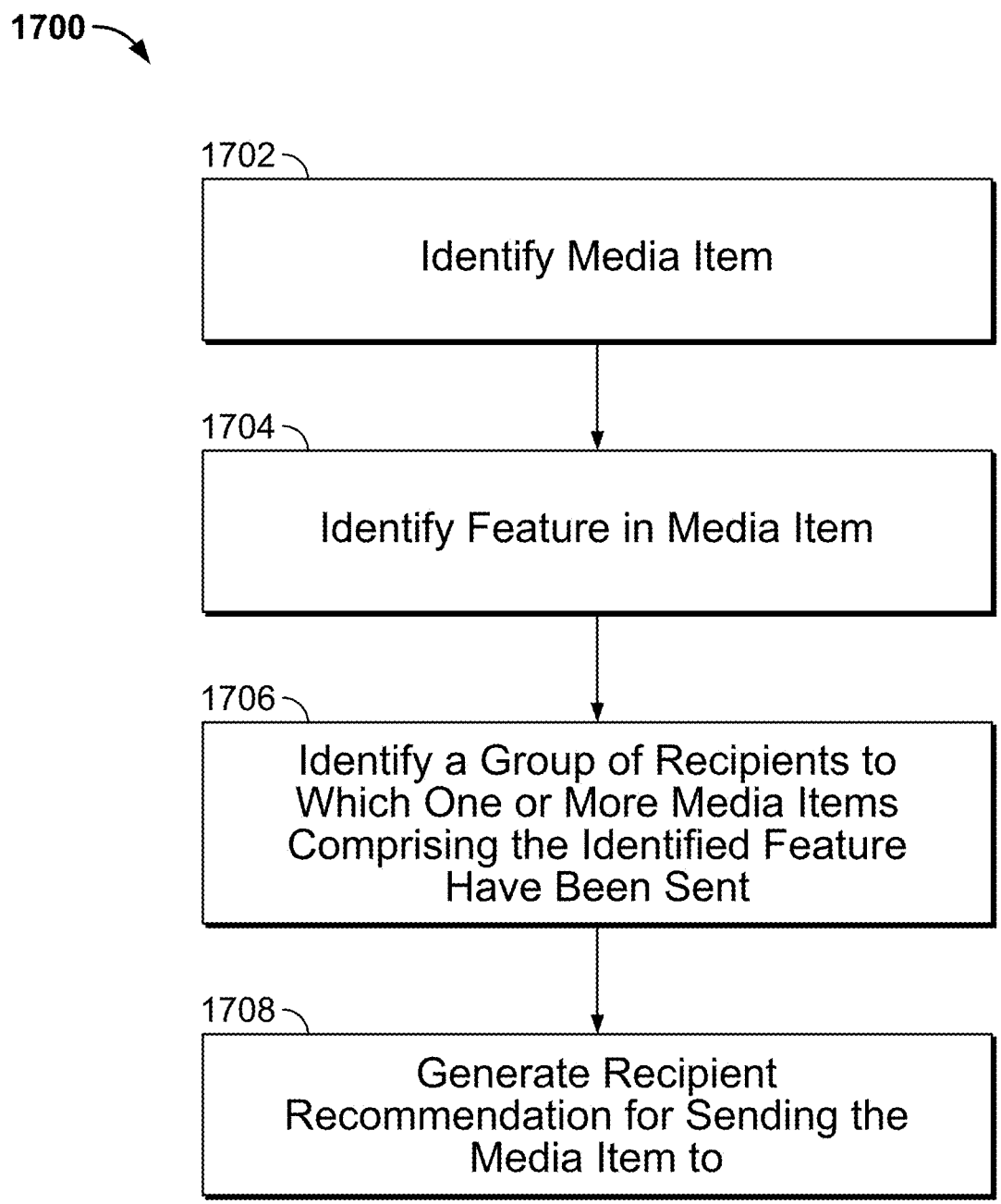
FIG. 17 is a flowchart of illustrative steps involved in generating a personalized media item recommendation, in accordance with some embodiments of the disclosure.

FIG. 17 is a flowchart of illustrative steps involved in generating a personalized message, in accordance with some embodiments of the disclosure. Process 1700 may be implemented on an aforementioned computing device 1200. In addition, one or more actions of the process 1700 may be incorporated into or combined with one or more actions of any other process or embodiments described herein.

At 1702, a media item is identified. At 1704, a feature in the identified media item is identified. At 1706, a group of recipients to which one or more media items comprising the identified feature have been sent are identified. At 1708, a recipient recommendation for sending the media item to is generated for display.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
receiving, at a first computing device, user input associated with sending a message via a platform;
identifying that a type associated with the platform is one of a casual communications platform, a friend communications platform, an acquaintance communications platform, a professional communications platform, or colleague communications platform;
identifying a respective casual, friend, acquaintance, professional, or colleague mode for personalizing a message, wherein the mode is identified based on the platform type and the mode defines a predefined rule that causes the personalized message to be generated in a style that is consistent with the identified mode;
identifying, at the first computing device, a media item;
identifying a group of one or more recipients to send the media item and the personalized message to;
identifying an association between a user of the computing device and a recipient from the group; and
generating, based at least in part on the association between the user and the recipient and the identified mode, a personalized message; and
sending, from the first computing device, the media item and personalized message to the recipient.

2. The method of claim 1, further comprising identifying a feature in the media item and wherein the generating the personalized message is further based on the identified feature.

3. The method of claim 1, further comprising:
receiving, at the computing device, an initial message input by the user;
sending, from the first computing device, a first media item and the initial message to an initial recipient, wherein the initial recipient is not part of the group, and wherein:
the identified media item is the same as the first media item; and
the generating the personalized message is further based on the initial message.

4. The method of claim 1, further comprising identifying one or more emotions in messages sent between the user and the recipient over a period of time and wherein the generating the personalized message is further based on at least one of the identified emotions.

5. The method of claim 1, wherein the generating the personalized message is further based on the platform that the message is being sent to.

6. The method of claim 1, wherein the identifying the association between the user and the recipient is further based on an input of a relationship between the user and the recipient.

7. The method of claim 1, wherein the generating the personalized message further comprises generating a personalized message based on a seed word and/or phrase input by the user.

8. A system comprising:
input circuitry configured to receive, at a first computing device, user input associated with sending a message via a platform; and
control circuitry configured to:
identify that a type associated with the platform is one of a casual communications platform, a friend communications platform, an acquaintance communications platform, a professional communications platform, or colleague communications platform;
identify a respective casual, friend, acquaintance, professional, or colleague mode for personalizing a message, wherein the mode is identified based on the platform type and the mode defines a predefined rule that causes the personalized message to be generated in a style that is consistent with the identified mode;
identify, at the first computing device, a media item;
identify a group of one or more recipients to send the media item and the personalized message to;
identify an association between a user of the computing device and a recipient from the group;
generate, based at least in part on the association between the user and the recipient and the identified mode, a personalized message; and
send, from the first computing device, the media item and personalized message to the recipient.

9. The system of claim 8, wherein the control circuitry is further configured to identify a feature in the media item and wherein the control circuitry configured to generate the personalized message is further configured to generate the personalized message based on the identified feature.

10. The system of claim 8, wherein the control circuitry is further configured to:
receive, at the computing device, an initial message input by the user;
send, from the first computing device, a first media item and the initial message to an initial recipient, wherein the initial recipient is not part of the group, and wherein:
the identified media item is the same as the first media item; and
the control circuitry configured to generate the personalized message is further configured to generate the personalized message based on the initial message.

11. The system of claim 8, wherein the control circuitry is further configured to identify one or more emotions in messages sent between the user and the recipient over a period of time and wherein the control circuitry configured to generate the personalized message is further configured to generate the personalized message based on at least one of the identified emotions.

12. The system of claim 8, wherein the control circuitry configured to generate the personalized message is further configured to generate the personalized message based on the platform that the message is being sent to.

13. The system of claim 8, wherein the control circuitry configured to identify the association between the user and the recipient is further configured to identify the association based on an input of a relationship between the user and the recipient.

14. The system of claim 8, wherein the control circuitry configured to generate the personalized message is further configured to generate a personalized message based on a seed word and/or phrase input by the user.

15. The method of claim 1, wherein generating the message in a profession style further comprises generating a message without emojis and/or abbreviations.

16. The system of claim 8, wherein the control circuitry is configured to generate a message in a profession style by generating a message without emojis and/or abbreviations.

* * * * *